United States Patent
Pao et al.

(10) Patent No.: US 11,350,451 B2
(45) Date of Patent: May 31, 2022

(54) METHOD OF HANDLING COMMUNICATION IN UNLICENSED SPECTRUM AND RELATED COMMUNICATION DEVICE

(71) Applicant: ACER INCORPORATED, New Taipei (TW)

(72) Inventors: Wei-Chen Pao, New Taipei (TW); Chien-Min Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 25 days.

(21) Appl. No.: 16/676,451

(22) Filed: Nov. 7, 2019

(65) Prior Publication Data

US 2020/0154475 A1  May 14, 2020

Related U.S. Application Data

(60) Provisional application No. 62/757,174, filed on Nov. 8, 2018.

(51) Int. Cl.
*H04W 74/08* (2009.01)
*H04L 1/00* (2006.01)
(Continued)

(52) U.S. Cl.
CPC ....... *H04W 74/0808* (2013.01); *H04L 1/0038* (2013.01); *H04L 5/0094* (2013.01);
(Continued)

(58) Field of Classification Search
CPC ... H04L 1/0038; H04L 1/1614; H04L 5/0094; H04W 24/08; H04W 72/042;
(Continued)

(56) References Cited

U.S. PATENT DOCUMENTS

2009/0146791 A1* 6/2009 Jantunen ............. H04B 5/0062
340/10.2
2016/0100406 A1* 4/2016 Chen ................. H04W 72/0413
370/329
(Continued)

FOREIGN PATENT DOCUMENTS

CN 105873225 8/2016
CN 107078887 8/2017
(Continued)

OTHER PUBLICATIONS

Vivo, Potential solutions and techniques for NR unlicensed spectrum, 3GPP TSG RAN WG1 Meeting #92, Feb. 26-Mar. 2, 2018, Athens, Greece, R1-1801557, XP051396809.
(Continued)

*Primary Examiner* — Melanie Jagannathan
(74) *Attorney, Agent, or Firm* — JCIPRNET

(57) ABSTRACT

A method of handling communication for a communication device of a wireless communication system, wherein the communication device is configured with a plurality of frequency bands, includes the step of: receiving a downlink (DL) control signal from a network of the wireless communication system via a first frequency band among the plurality of frequency bands, wherein the DL control signal indicates whether at least one of the plurality of frequency bands is available or not available.

21 Claims, 26 Drawing Sheets

(51) Int. Cl.
*H04L 5/00* (2006.01)
*H04W 24/08* (2009.01)
*H04W 72/04* (2009.01)
*H04W 72/14* (2009.01)
*H04W 80/08* (2009.01)

(52) U.S. Cl.
CPC ......... *H04W 24/08* (2013.01); *H04W 72/042* (2013.01); *H04W 72/0453* (2013.01); *H04W 72/14* (2013.01); *H04W 80/08* (2013.01)

(58) Field of Classification Search
CPC . H04W 72/0453; H04W 72/08; H04W 72/14; H04W 74/0808; H04W 80/08
See application file for complete search history.

(56) References Cited

U.S. PATENT DOCUMENTS

| | | | |
|---|---|---|---|
| 2016/0128033 A1 | 5/2016 | Larsson et al. | |
| 2016/0227566 A1* | 8/2016 | Bergstrom | H04W 74/0808 |
| 2016/0278088 A1* | 9/2016 | Cheng | H04W 28/18 |
| 2016/0360553 A1* | 12/2016 | Cheng | H04W 4/08 |
| 2017/0196020 A1* | 7/2017 | Mukherjee | H04W 74/004 |
| 2017/0202022 A1* | 7/2017 | Chendamarai Kannan | H04W 72/14 |
| 2017/0223675 A1 | 8/2017 | Dinan et al. | |
| 2018/0027554 A1 | 1/2018 | Yerramalli et al. | |
| 2018/0139617 A1* | 5/2018 | Belghoul | H04W 74/0808 |
| 2018/0183551 A1 | 6/2018 | Chou et al. | |
| 2018/0255578 A1* | 9/2018 | Kim | H04W 74/0808 |
| 2019/0053206 A1* | 2/2019 | Babaei | H04L 1/1883 |
| 2019/0053219 A1* | 2/2019 | Tiirola | H04L 1/1854 |
| 2019/0140881 A1* | 5/2019 | Akkarakaran | H04L 5/0048 |
| 2019/0150186 A1* | 5/2019 | Karaki | H04W 72/1284 370/329 |
| 2019/0174542 A1* | 6/2019 | Lei | H04L 5/0053 |
| 2019/0190668 A1* | 6/2019 | Lei | H04W 74/085 |
| 2019/0230578 A1* | 7/2019 | Karaki | H04W 74/0816 |
| 2019/0268918 A1* | 8/2019 | Baghel | H04W 72/0406 |
| 2019/0274162 A1* | 9/2019 | Zhang | H04W 74/08 |
| 2019/0335427 A1* | 10/2019 | Sun | H04B 7/0626 |
| 2019/0357255 A1* | 11/2019 | Sun | H04L 5/0062 |
| 2019/0373636 A1* | 12/2019 | Yerramalli | H04L 5/0055 |
| 2020/0053779 A1* | 2/2020 | Jeon | H04L 1/0026 |
| 2020/0084802 A1* | 3/2020 | Jung | H04W 16/14 |
| 2020/0100170 A1* | 3/2020 | Babaei | H04W 48/12 |
| 2020/0112484 A1* | 4/2020 | Sun | H04W 28/06 |
| 2020/0119872 A1* | 4/2020 | Wu | H03M 13/13 |
| 2020/0146063 A1* | 5/2020 | Xu | H04L 5/0048 |
| 2020/0146064 A1* | 5/2020 | Oh | H04L 1/1614 |
| 2020/0196343 A1* | 6/2020 | Marinier | H04L 1/1854 |
| 2020/0205163 A1* | 6/2020 | Nam | H04W 74/006 |
| 2020/0281018 A1* | 9/2020 | Li | H04L 5/0051 |
| 2020/0344718 A1* | 10/2020 | Ozturk | H04W 68/005 |
| 2020/0351668 A1* | 11/2020 | Kundu | H04W 74/0808 |
| 2021/0007101 A1* | 1/2021 | Tooher | H04W 24/02 |
| 2021/0250953 A1* | 8/2021 | Sun | H04W 72/0453 |

FOREIGN PATENT DOCUMENTS

| | | |
|---|---|---|
| CN | 107079333 | 8/2017 |
| CN | 107370580 | 11/2017 |
| CN | 107743695 | 2/2018 |
| CN | 107948988 | 4/2018 |
| CN | 108289336 | 7/2018 |
| WO | 2017147515 | 8/2017 |

OTHER PUBLICATIONS

Qualcomm, Study on NR-based Access to Unlicensed Spectrum, 3GPP TSG RAN meeting #81, Sep. 10-13, 2018, Gold Coast, Australia, RP-181704, XP051550798.

Huawei et al., Discussion on BWP operation for NR-U, 3GPP TSG-RAN WG2 Meeting #103, Aug. 20-24, 2018, Gothenburg, Sweden, R2-1811939, Resubmission of R2-1808468, XP051521569.

Vivo, Design considerations for standalone operation in NR unlicensed spectrum, 3GPP TSG RAN WG1 Meeting #92bis, Apr. 16-20, 2018, Sanya, China, R1-1803858, XP051426153.

* cited by examiner

METHOD OF HANDLING COMMUNICATION IN UNLICENSED SPECTRUM AND RELATED COMMUNICATION DEVICE

CROSS REFERENCE TO RELATED APPLICATIONS

This application claims the benefit of U.S. Provisional Application No. 62/757,174, filed on Nov. 8, 2018, the contents of which are incorporated herein by reference.

BACKGROUND OF THE INVENTION

1. Field of the Invention

The present invention relates to a method utilized in a wireless communication system, and more particularly, to a method of handling communication in an unlicensed spectrum of the wireless communication system.

2. Description of the Prior Art

In the long-term evolution (LTE) system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway (SGW), an access and mobility management function (AMF), a user plane function (UPF), etc., for a Non-Access Stratum (NAS) control. The LTE-advanced (LTE-A) system is an evolution of the LTE system, targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

The fifth generation (5G) system (5GS) (e.g., 5G new radio access network (5G-NR)) is an evolution of a continuous mobile broadband process to meet the requirements of 5G as introduced by International Mobile Telecommunications (IMT)-2020. The 5GS may include a radio access network (RAN) and a core network (CN). The RAN may include at least one base station (BS). The at least one BS may include an evolved Node-B (eNB) or a 5G Node-B (gNB), for communicating with at least one UE and for communicating with the CN. The CN may include a MME, a SGW, etc., for a NAS control.

In the 5G-NR system, the gNB is capable of dynamically allocating the bandwidth between the gNB and a nearby UE, where the frequency band may be separated into several bandwidth parts (BWPs), to achieve transmission flexibility and increase the utilization efficiency of spectrum. For example, the gNB may transmit a downlink (DL) signal to the UE, to notify the UE to perform communication in a specified BWP. If the wireless communication between the gNB and the UE is performed in an unlicensed spectrum, a clear channel assessment (CCA) check or a listen before talk (LBT) procedure may be performed within a designated time period before a transmission is performed. For example, the UE or gNB may detect the energies on the channel and thereby determine whether the channel is occupied. In this case, the DL signal for bandwidth allocation should be transmitted after the LBT is performed by the gNB and the LBT result indicates that the channel is available. If the LBT result indicates that the channel is unavailable, the bandwidth allocation may not be successfully performed; hence, the gNB cannot successfully allocate the target BWP to the UE, and this decreases the efficiency of bandwidth allocation.

In the unlicensed spectrum of 5G-NR system (NR-U), a serving cell may be configured with a large bandwidth to realize wideband transmission in the 5G-NR system. To facilitate the bandwidth allocation, the cell may include multiple BWPs configured to a UE and activated. The gNB may transmit DL data to the UE in a part of or an entire BWP based on the result of the LBT operation. However, there is no effective way for the gNB to inform the UE which part(s) of the BWP or which BWP(s) passes the LBT check. Thus, there is a need for improvement over the prior art.

SUMMARY OF THE INVENTION

It is therefore an objective of the present invention to provide a method of handling communication in an unlicensed spectrum of the wireless communication system, allowing the user equipment (UE) to be informed by the 5G Note-B (gNB) of which sub-band(s) or BWP(s) passes the listen before talk (LBT) check.

An embodiment of the present invention discloses a method of handling communication for a communication device of a wireless communication system. The communication device is configured with a plurality of frequency bands. The method comprises receiving a downlink (DL) control signal from a network of the wireless communication system via a first frequency band among the plurality of frequency bands, wherein the DL control signal indicates whether at least one of the plurality of frequency bands is available or not available.

Another embodiment of the present invention discloses a communication device of a wireless communication system for handling communication. The communication device is configured with a plurality of frequency bands and comprises a processor and a memory. The processor is configured to execute a program code. The memory, coupled to the processor, is configured to store the program code which instructs the processor to perform the following step: receiving a DL control signal from a network of the wireless communication system via a first frequency band among the plurality of frequency bands, wherein the DL control signal indicates whether at least one of the plurality of frequency bands is available or not available.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
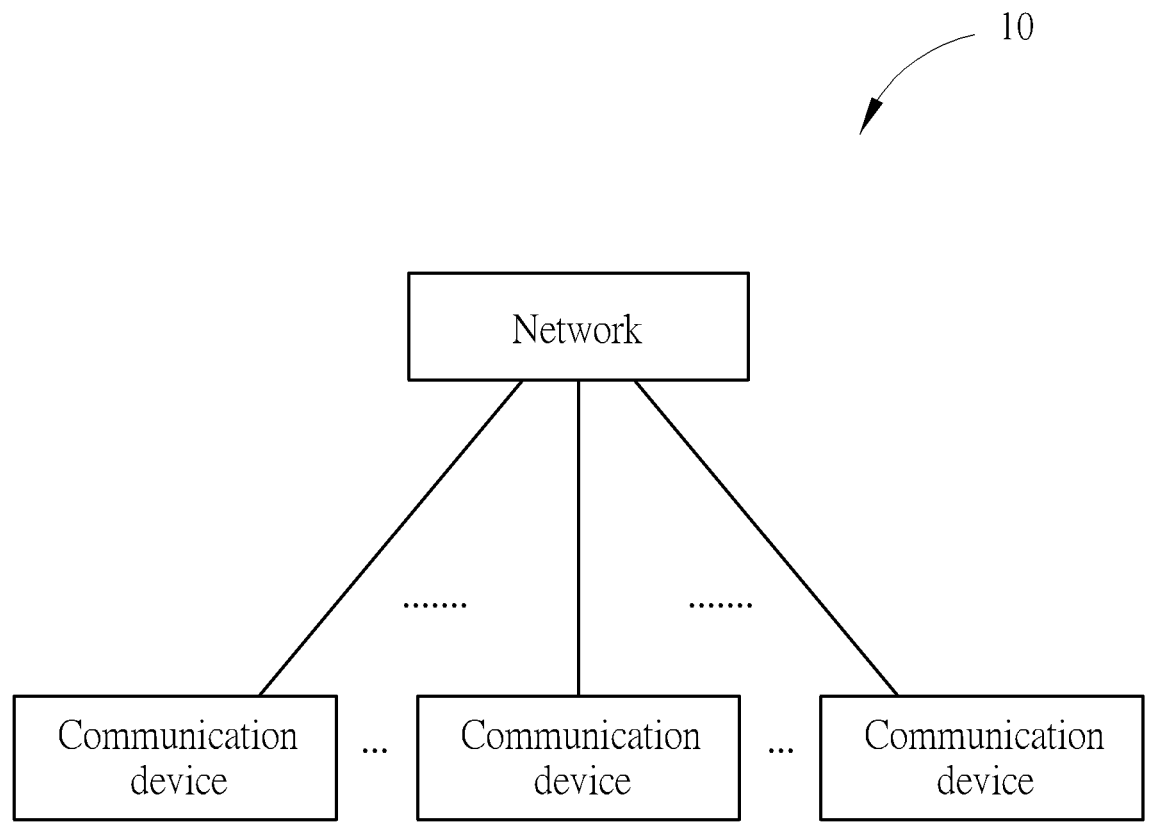
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 is briefly composed of a network and a plurality of communication devices. The network and a communication device may communicate with each other via one or more carriers, which may be in unlicensed band(s). In FIG. 1, the network and the communication devices are simply utilized for illustrating the structure of the wireless communication system 10. Practically, the network may be a 5G Node-B (gNB) in a 5G new ratio (NR) system, or may be an evolved Node-B (eNB) in a long-term evolution (LTE) system, a LTE advanced (LTE-A) system or an evolution of the LTE-A system.

In FIG. 1, a communication device may be, for example, a UE, a mobile phone, a tablet computer, an electronic book, a portable computer system or a vehicle. The network may be, for example, a cell, a serving cell, a transmission reception point (TRP), an unlicensed cell, an unlicensed serving cell, an unlicensed TRP, an eNB or a gNB, but is not limited thereto. In addition, the network and the communication device may be seen as a transmitter or a receiver. For an uplink (UL) transmission, the communication device is the transmitter and the network is the receiver, and for a downlink (DL) transmission, the network is the transmitter and the communication device is the receiver.

Figure 2:
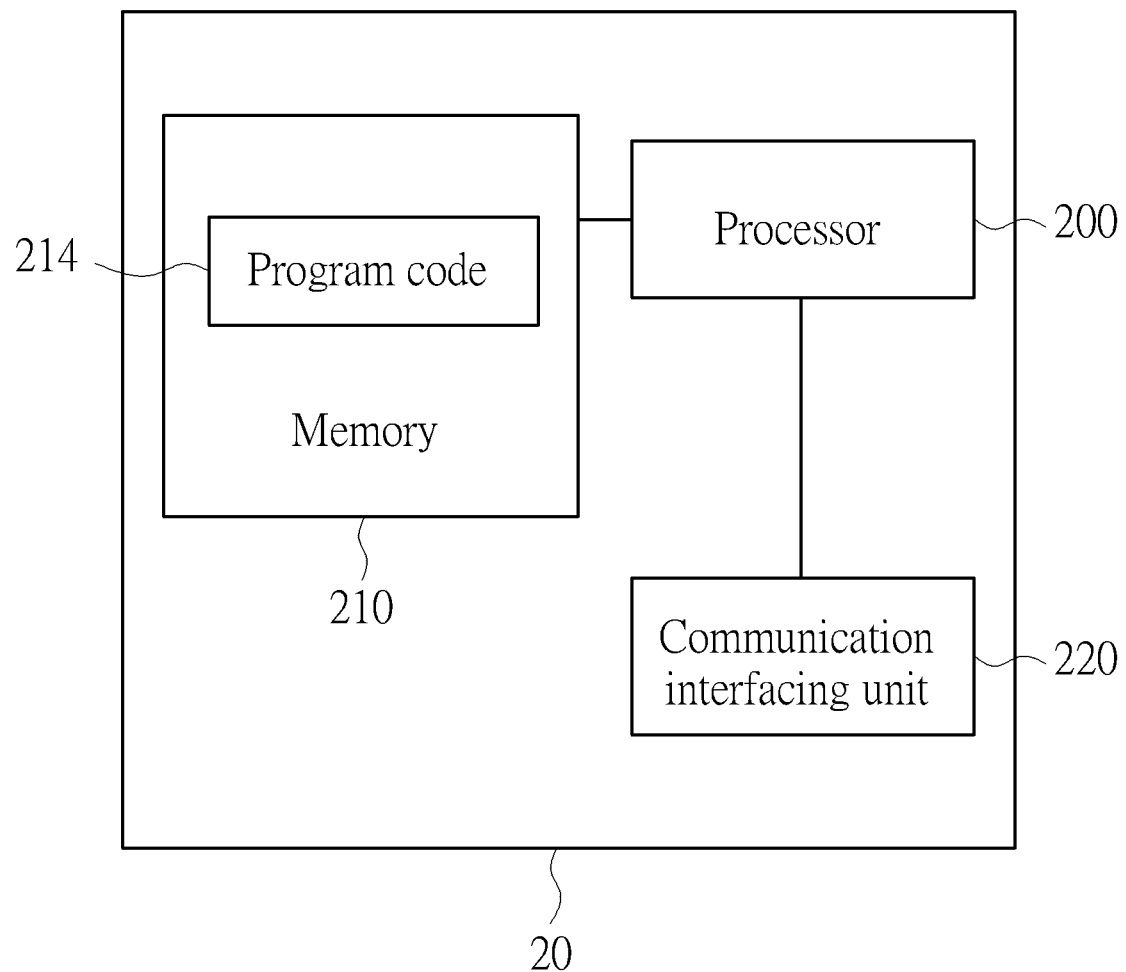
FIG. 2 is a schematic diagram of a communication device according to an embodiment of the present invention.

Please refer to FIG. 2, which is a schematic diagram of a communication device 20 according to an embodiment of the present invention. The communication device 20 may be a communication device or the network shown in FIG. 1, but is not limited herein. The communication device 20 may include a processor 200 such as a microprocessor or Application Specific Integrated Circuit (ASIC), a memory 210 and a communication interfacing unit 220. The memory 210 may be any data storage device that may store a program code 214, accessed and executed by the processor 200. Examples of the memory 210 include but are not limited to a subscriber identity module, read-only memory, flash memory, random-access memory, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processor 200.

For the sake of simplicity, in the following embodiments, a UE and a gNB are used for illustrating the communication device and the network, respectively. It should be noted that the scope of the present invention is not limited thereto.

Figure 3A:
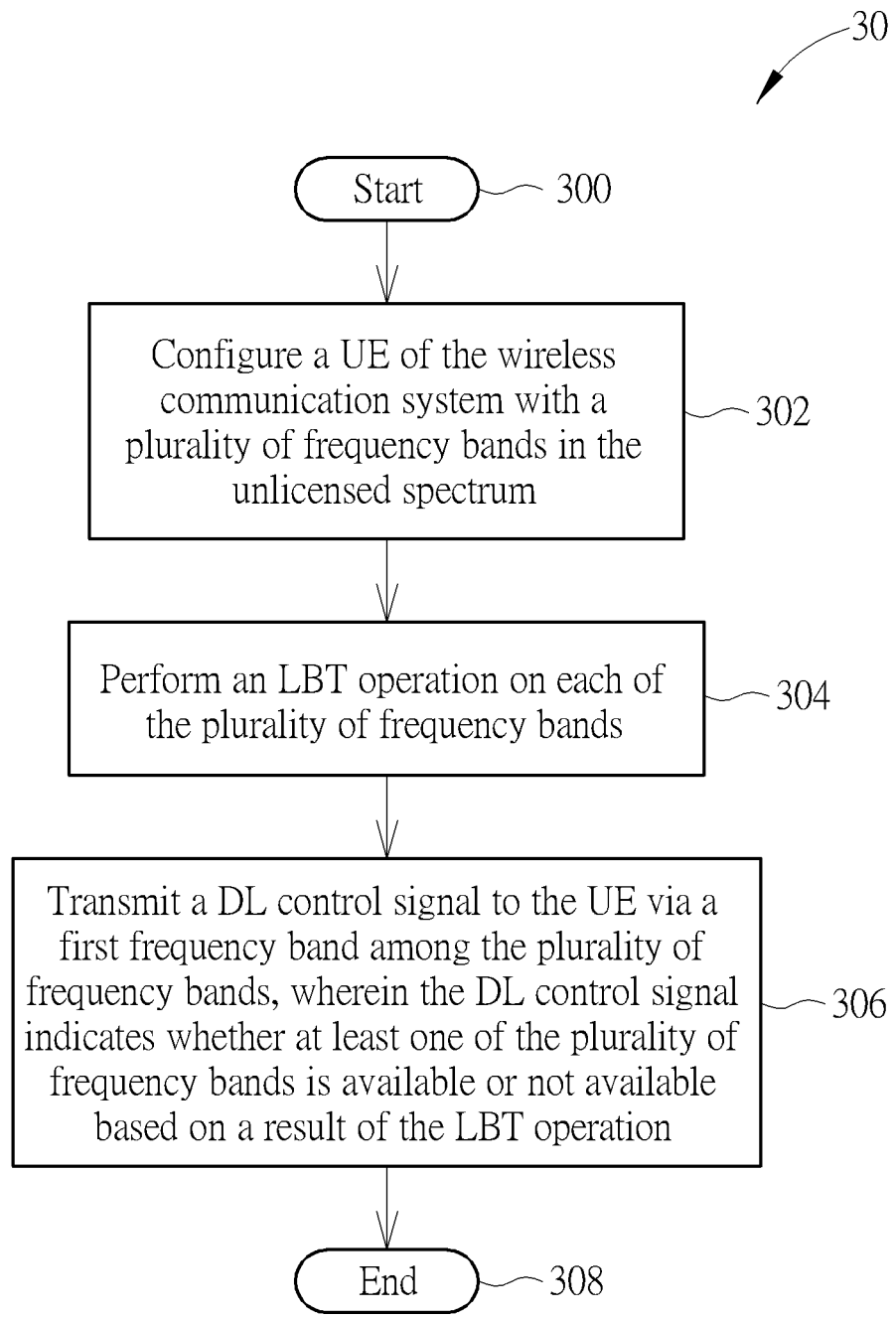
FIG. 3A is a flowchart of a process utilized in a gNB according to an embodiment of the present invention.

Please refer to FIG. 3A, which is a flowchart of a process 30 according to an embodiment of the present invention. The process 30 may be utilized in a gNB of a wireless communication system, to handle communication in an unlicensed spectrum which requires a listen before talk (LBT) operation before signal transmission. The process 30 may be compiled into the program code 214 and includes the following steps:

Step 300: Start.

Step 302: Configure a UE of the wireless communication system with a plurality of frequency bands in the unlicensed spectrum.

Step 304: Perform an LBT operation on each of the plurality of frequency bands.

Step 306: Transmit a DL control signal to the UE via a first frequency band among the plurality of frequency bands, wherein the DL control signal indicates whether at least one of the plurality of frequency bands is available or not available based on a result of the LBT operation.

Step 308: End.

Figure 4:
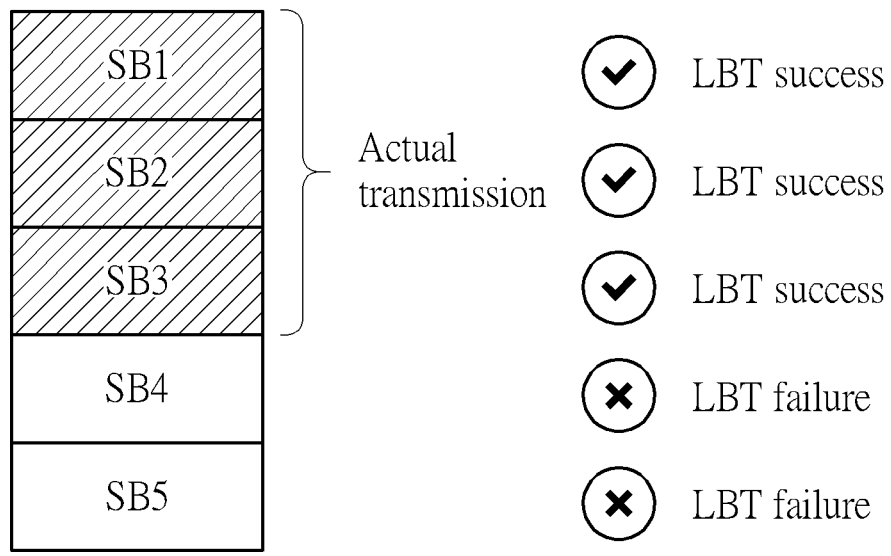
FIG. 4 is a schematic diagram of bandwidth allocation with sub-bands according to an embodiment of the present invention.

According to the process 30, the gNB may configure the UE with multiple frequency bands in the unlicensed spectrum (Step 302). As mentioned above, in a serving cell, there may be multiple bandwidth parts (BWPs) configured to the UE, and each BWP may include multiple sub-bands. A sub-band may refer to a frequency range or a LBT bandwidth (e.g., 20 MHz bandwidth) as a unit of performing LBT, which may be apart of the BWP. Please refer to FIG. 4, which is a schematic diagram of bandwidth allocation with sub-bands according to an embodiment of the present invention. As shown in FIG. 4, a BWP, which includes 5 sub-bands SB1-SB5, may be configured to the UE, where each sub-band SB1-SB5 may have the same or different bandwidths. In detail, the gNB may allocate 5 sub-bands SB1-SB5 to the UE, and transmit the allocation information to the UE via a higher layer signal and/or a physical layer signal. Note that the higher layer signal may correspond to a communication layer higher than the physical layer, and the physical layer signal may correspond to DL control information. The allocation information may include various information of configured resources, such as the identity(s) (IDs) of the configured BWP(s) and/or sub-band(s), and the location and bandwidth of each sub-band. The higher layer signal may correspond to a radio resource control (RRC) signaling or a media access control (MAC) control element (CE).

Before a UL or DL transmission in each sub-band, the LBT operation may be performed on the sub-band by the gNB (for DL transmission) or the UE (for UL transmission) (Step 304). An LBT operation may be dedicated to a respective sub-band, to determine whether the sub-band is available and is able to perform the transmission. Therefore, although an entire BWP is configured to the UE, the actual transmission may not be performed in the entire BWP; instead, the actual transmission may be performed only in those sub-bands passing the LBT check. In this embodiment, the sub-bands SB1-SB3 pass the LBT check and are available for signal or data transmission (as denoted by LBT success), but the sub-bands SB4-SB5 do not pass the LBT check and are unavailable for signal or data transmission (as denoted by LBT failure).

Figure 5:
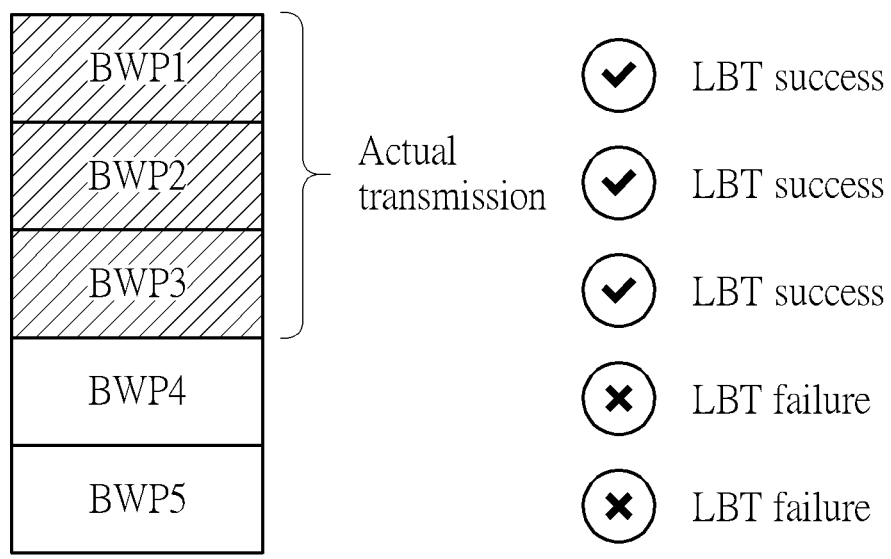
FIG. 5 is a schematic diagram of bandwidth allocation with BWPs according to an embodiment of the present invention.

In another embodiment, the UE may be configured with multiple BWPs and an LBT operation is dedicated to a respective BWP. For example, please refer to FIG. 5, which is a schematic diagram of bandwidth allocation with BWPs according to an embodiment of the present invention. As shown in FIG. 5, there may be 5 BWPs BWP1-BWP5 in a cell configured to the UE, and each BWP BWP1-BWP5 may have the same or different bandwidths. Before a UL or DL transmission in each BWP, the LBT operation may be performed on the BWP by the gNB (for DL transmission) or the UE (for UL transmission). The operations of bandwidth allocation and LBT procedure shown in FIG. 5 are similar to those shown in FIG. 4, except that the LBT object has a larger granularity in the embodiment of FIG. 5. In this embodiment, the BWPs BWP1-BWP3 pass the LBT check and are available for signal or data transmission (as denoted by LBT success), but the BWPs BWP4-BWP5 do not pass the LBT check and are unavailable for signal or data transmission (as denoted by LBT failure).

Figure 6:
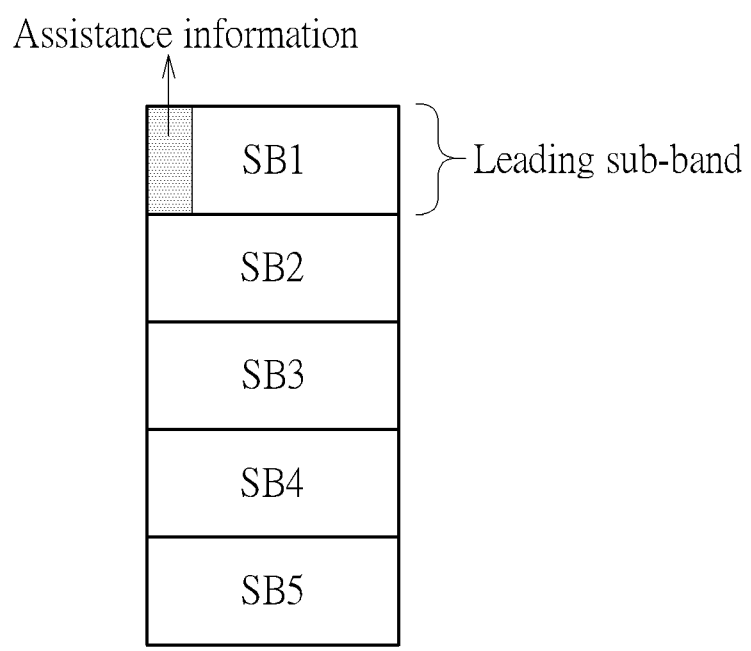
FIG. 6 is a schematic diagram of transmitting the assistance information in the leading sub-band.

After the sub-bands SB1-SB5 and/or the BWPs BWP1-BWP5 are configured, the gNB may perform an LBT operation on each of the sub-bands SB1-SB5 and/or each of the BWPs BWP1-BWP5, and determine which sub-band(s) and/or BWP(s) is valid or available. Based on the LBT results for sub-bands, the gNB may perform DL transmission on only parts of the BWP, and preferably, the related information of LBT results should also be sent to the UE. In order to notify the UE which sub-bands are available and which sub-bands are not available based on the LBT result, the gNB may transmit a DL control signal to the UE via one of the configured sub-bands (Step 306). In an embodiment, the DL control signal may include assistance information which indicates whether each of the sub-bands is available or not. In detail, one of the sub-bands may be configured as a leading sub-band or a designated sub-band, and the information of the leading sub-band is sent to the UE via a higher layer signal and/or a physical layer signal during the configuration procedure of the sub-bands. Please refer to FIG. 6, which is a schematic diagram of transmitting the assistance information in the leading sub-band. As shown in FIG. 6, among the sub-bands SB1-SB5 configured to the UE, the sub-band SB1 is the leading sub-band that carries the assistance information.

Figure 3B:
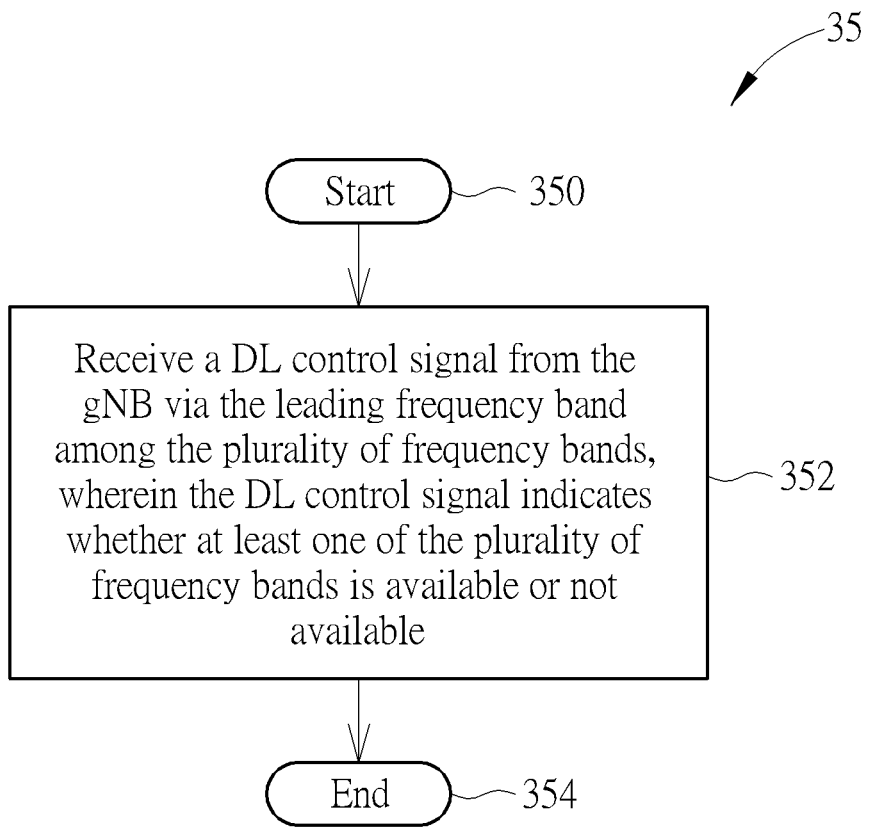
FIG. 3B is a flowchart of a process utilized in a UE according to an embodiment of the present invention.

The above implementations and operations of a UE (such as any of the UE UE1-UE3) may be summarized into a process 35, as shown in FIG. 3B. The UE may communicate with the gNB, to be configured with a plurality of frequency bands in an unlicensed spectrum. The process 35 may be compiled into the program code 214 and includes the following steps:

Step 350: Start.

Step 352: Receive a DL control signal from the gNB via the leading frequency band among the plurality of frequency bands, wherein the DL control signal indicates whether at least one of the plurality of frequency bands is available or not available.

Step 354: End.

According to the process 35, the UE is configured to receive the DL control signal from the gNB via a frequency band which is previously configured as the leading frequency band. Therefore, the UE may be configured to monitor a common search space in the leading sub-band, in order to acquire the DL control signal, e.g., the assistance information.

In an embodiment, the gNB may inform the UE of a resource in which the DL control signal such as the assistance information is transmitted. The resource may be included in a control resource set (COREST), which notifies a time-frequency resource carrying the assistance information to the UE. Therefore, the UE may perform blind detection on the resource to find if there is the DL control signal. Alternatively, each sub-band may include a control resource set, and the gNB may inform the UE that the DL control signal may be included in the control resource set of a specific sub-band, e.g., the leading sub-band SB1; hence, the UE may perform blind detection on the resource included in the control resource set of the specific sub-band.

Preferably, the DL control signal should be carried by a sub-band having better channel quality, and the sub-band may pass the LBT check more probably. Therefore, the gNB may select a sub-band with better channel quality as the leading sub-band. The gNB may perform Type 1 LBT operation on the leading sub-band (e.g., SB1), and perform Type 2 LBT operation on other sub-bands of the BWP (e.g., SB2-SB5). If Type 1 LBT on the leading sub-band is successfully completed, Type 2 LBT for other sub-bands is feasible. Thus, the DL control signal may be included in the leading sub-band applying the Type 1 LBT. The Type 1 LBT refers to a long sensing LBT where the gNB may sense the channel for a sensing interval which is determined according to a channel access priority class. The channel access priority class includes several different classes indicating different range of contention window size and/or maximum channel occupancy time (MCOT). The Type 2 LBT is a short sensing LBT where the sensing interval is shorter than the Type 1 LBT.

Figure 7:
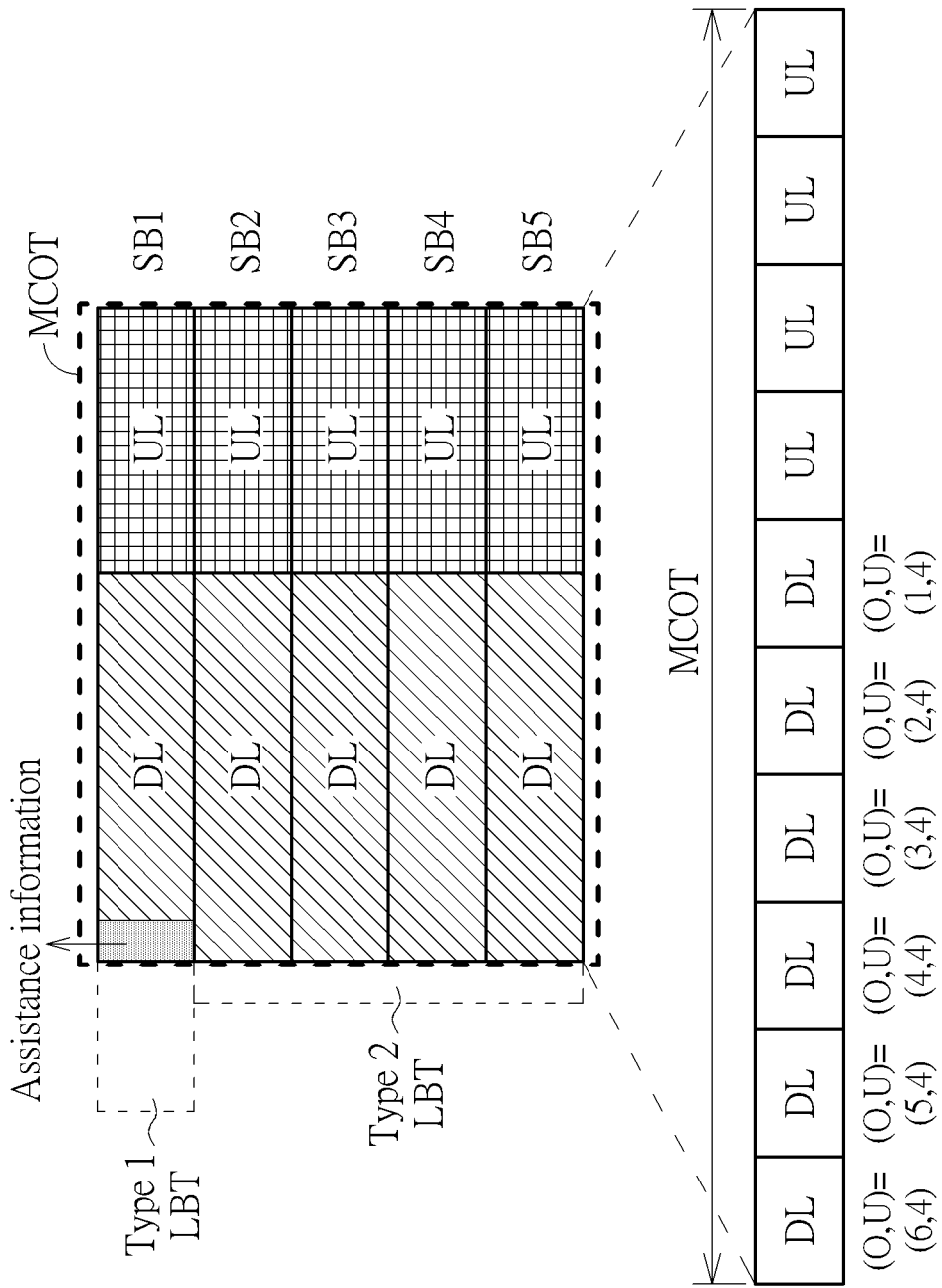
FIG. 7 is a schematic diagram of allocation of channel occupancy according to an embodiment of the present invention.

In an embodiment, the DL control signal (e.g., the assistance information) may not only indicate which sub-band(s) is available and accessible, but also indicate allocation of at least one of DL resource(s), UL resource(s), and/or flexible resource(s) in a MOOT within a transmission burst. These resources may be a time slot or an orthogonal frequency division multiplexing (OFDM) symbol. For example, the DL control signal may include several parameters indicating the channel occupancy in the MOOT, i.e., the usage of DL and UL. Please refer to FIG. 7, which is a schematic diagram of allocation of channel occupancy according to an embodiment of the present invention. As shown in FIG. 7, there are 5 sub-bands SB1-SB5 configured to the UE. The sub-band SB1 is the leading sub-band that carries the assistance information; hence, the Type 1 LBT is performed on the sub-band SB1, while the Type 2 LBT is performed on other sub-bands SB2-SB5 at the same time. The MOOT includes 10 time slots, as allocated with 6 DL slots followed by 4 UL slots in each sub-band SB1-SB5. In an embodiment, the DL control signal (e.g., the assistance information) may include an offset parameter (O) and a UL burst duration parameter (U). The offset parameter indicates the number of slots to the start of UL burst from the slot carrying a DL signal, e.g., DL control information (DCI). For example, as shown in FIG. 7, the offset parameter in the first DL slot is 6, the offset parameter in the second DL slot is 5, and so on. The UL burst duration parameter indicates the number of UL slots in the channel occupancy time. For example, as shown in FIG. 7, the UL burst duration parameter in each DL slot is 4 since there are 4 UL slots in the MOOT within the transmission burst.

Figure 8:
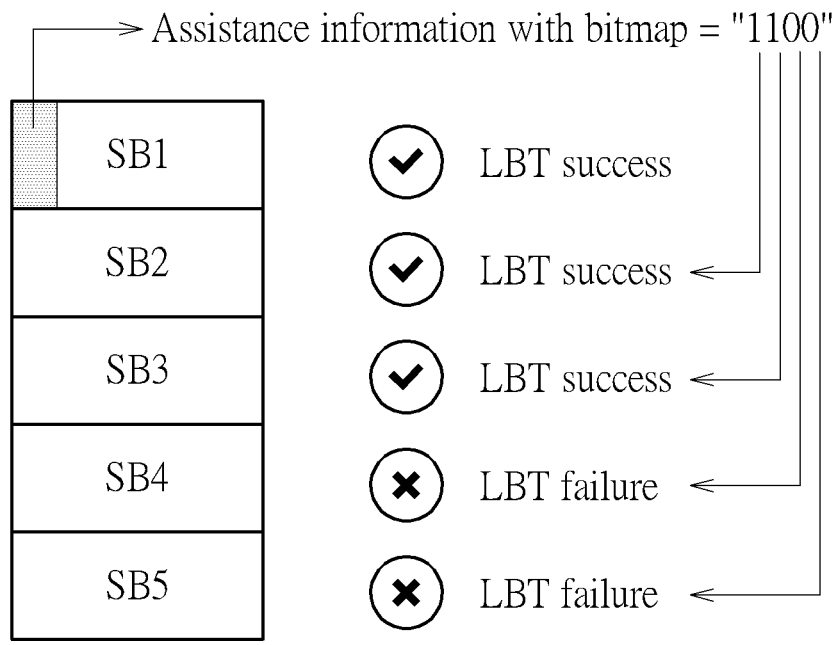
FIGS. 8-11 are schematic diagrams of sub-band configuration with assistance information having a bitmap according to an embodiment of the present invention.

In an embodiment, the assistance information may include a bitmap indicating whether at least one of the sub-bands SB1-SB5 is available or not available. In detail, the bitmap may include a plurality of signal bits corresponding to at least one of the sub-bands SB1-SB5, respectively, for indicating the availability of each sub-band. Each signal bit may indicate whether one of the plurality of frequency bands other than the leading sub-band SB1 is available or not. For example, please refer to FIG. 8, which is a schematic diagram of sub-band configuration with assistance information having a bitmap according to an embodiment of the present invention. As shown in FIG. 8, the UE is configured with 5 sub-bands SB1-SB5, and the sub-band SB1 is the leading sub-band carrying the assistance information. The assistance information includes a bitmap "1100" which indicates the availability of the sub-bands SB2-SB5, respectively. In detail, the bit "0" means that the corresponding sub-band is unavailable since the LBT performed by the gNB indicates that the sub-band is unavailable for DL transmission, i.e., LBT failure, and the bit "1" means that the corresponding sub-band is available since the LBT performed by the gNB indicates that the sub-band is available for DL transmission, i.e., LBT success. In this embodiment, the sub-bands SB2 and SB3 are available, and the sub-bands SB4 and SB5 are unavailable according to the LBT results, and the related information is forwarded to the UE via the bitmap "1100".

Please note that this bitmap does not include the availability information of the leading sub-band SB1. This is because the UE may infer that the leading sub-band SB1 is available if the assistance information is successfully received by the UE.

Figure 9:
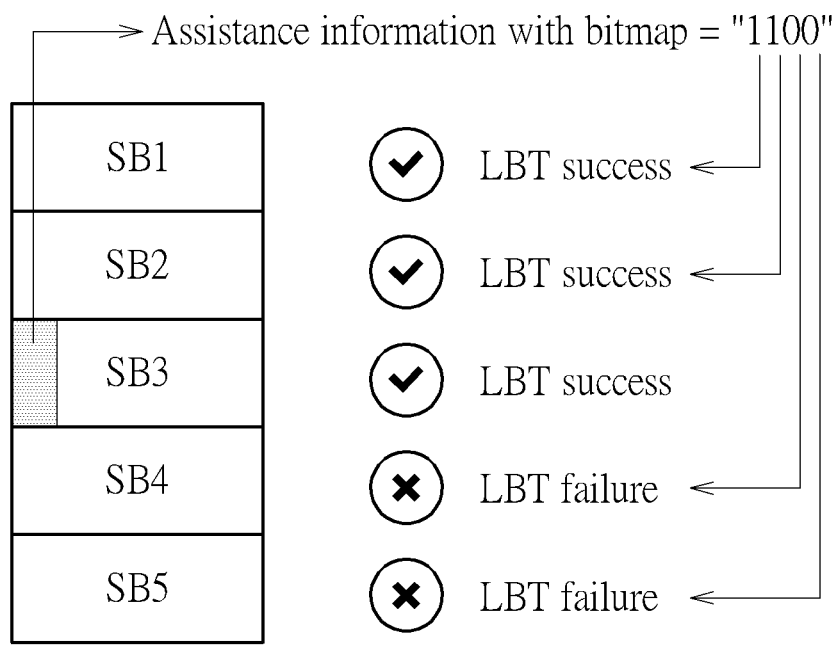

FIG. 9 illustrates another implementation of the assistance information and the bitmap. In this embodiment as shown in FIG. 9, the leading sub-band carrying the assistance information is SB3, and the bitmap is "1100", which indicates the availability of the sub-bands SB1, SB2, SB4 and SB5, respectively. In detail, the sub-bands SB1 and SB2 are available and the sub-bands SB4 and SB5 are not available, as represented by the bitmap in a normal order corresponding to the sub-bands.

Figure 10:
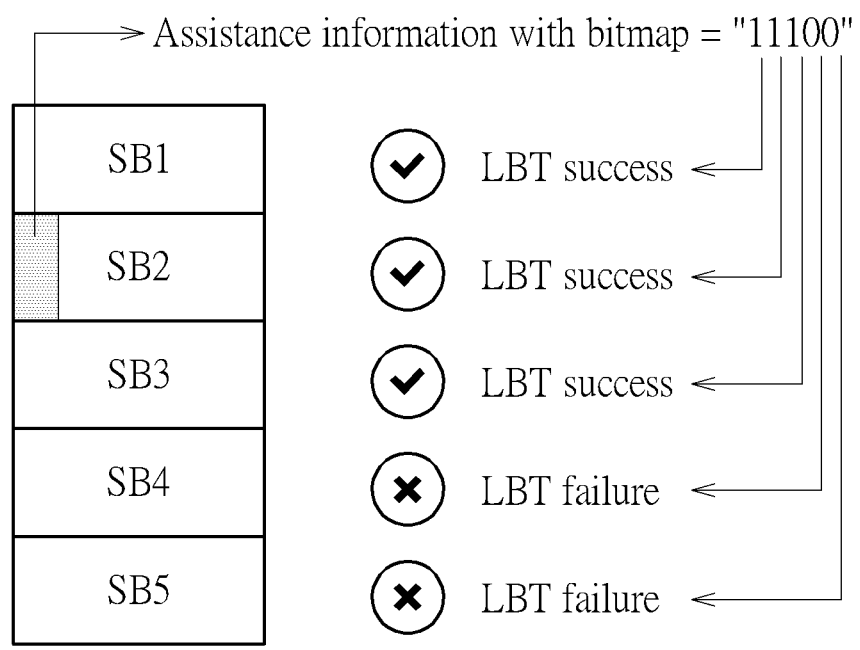

FIG. 10 illustrates a further implementation of the assistance information and the bitmap. In this embodiment as shown in FIG. 10, the leading sub-band carrying the assistance information is SB2, and the bitmap is "11100", which indicates the availability of all sub-bands SB1-SB5 in the BWP. That is, the bitmap includes information of each sub-band including the leading sub-band and other sub-bands.

Figure 11:
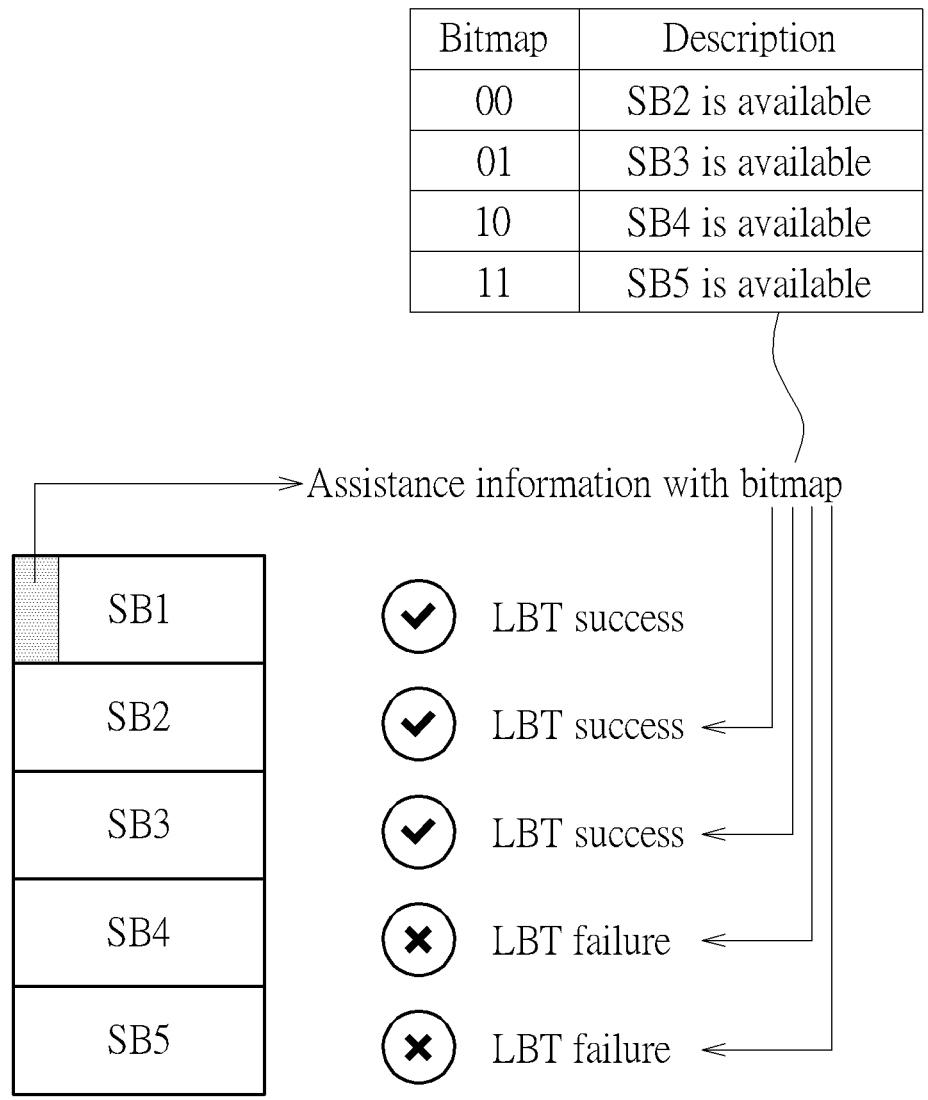

In another embodiment, the bitmap may be configured to have different formats, as shown in FIG. 11. In this embodiment, the leading sub-band carrying the assistance information is SB1, and the bitmap may include any of the bit sequences "00", "01", "10" and "11", which indicate any of the sub-bands SB2, SB3, SB4 and SB5, respectively, is available. Since the sub-bands SB2 and SB3 are available and the sub-bands SB4 and SB5 are unavailable, the gNB may include the bit sequences "00" and "01" in the assistance information. The UE may be configured to obtain a table with the mapping of bit sequences and availability situations, to determine the availability of each sub-band.

Figure 12:
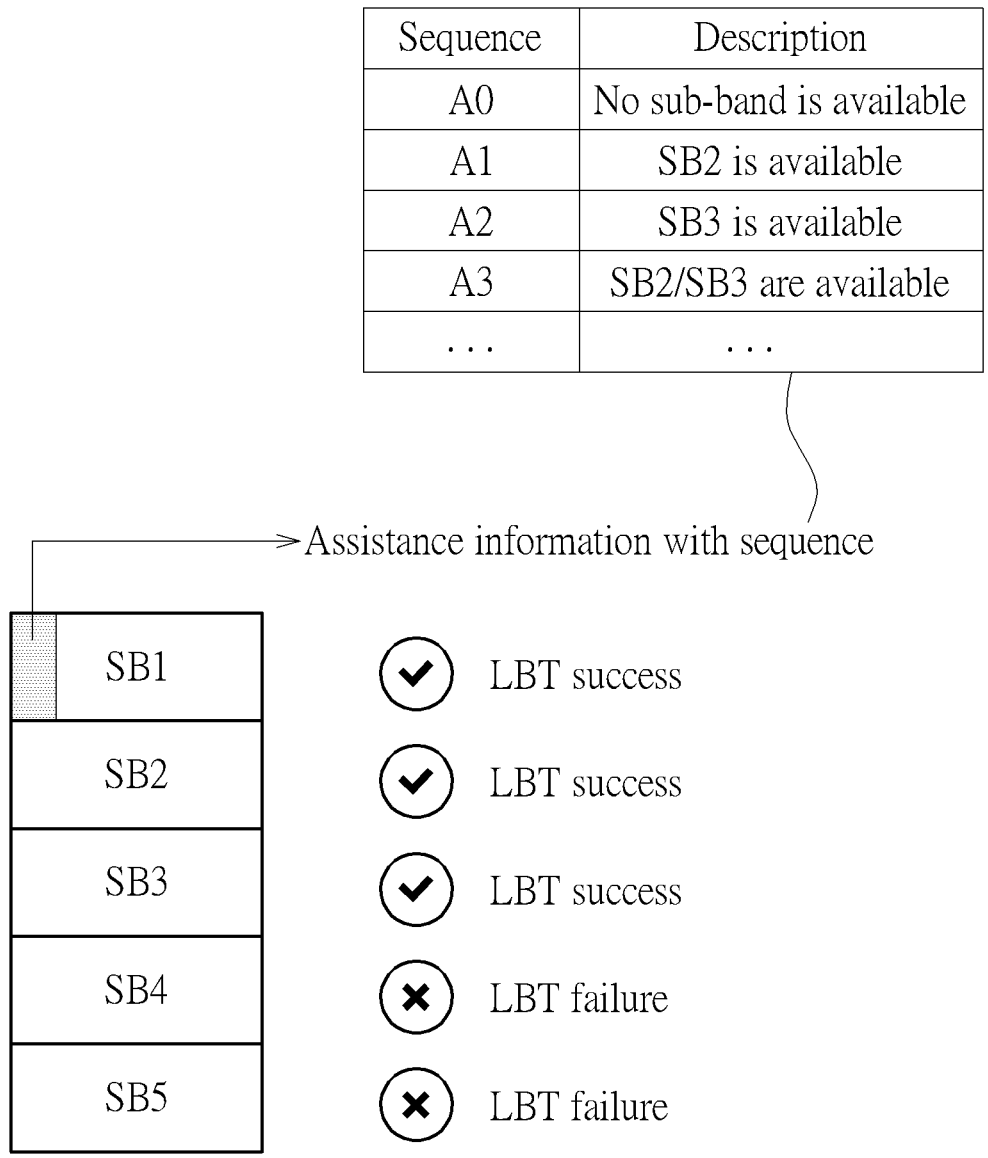
FIG. 12 illustrates another implementation of the assistance information represented as a signal sequence to identify available sub-bands.

FIG. 12 illustrates another implementation of the assistance information, which is represented as a signal sequence to identify available sub-bands. In detail, the UE may be configured to obtain a table with the mapping of signal sequences and availability conditions, to determine the availability of each sub-band based on the received sequence in the assistance information. As shown in FIG. 12, the sequence A0 indicates that none of the sub-bands SB2-SB5 is available, the sequence A1 indicates that the sub-band SB2 is available and the sub-bands SB3-SB5 are not available, the sequence A2 indicates that the sub-band SB3 is available and the sub-bands SB2, SB4 and SB5 are not available, and the sequence A3 indicates that the sub-bands SB2 and SB3 are available and the sub-bands SB4 and SB5 are not available. Other sequences indicating other availability situations may also be included in the table but are omitted herein for brevity. In this embodiment, since the sub-bands SB2 and SB3 are available and the sub-bands SB4 and SB5 are not available, the gNB may include the sequence A3 in the assistance information.

Please note that in the above embodiments, one of the sub-bands is configured as the leading sub-band that carries the assistance information. Alternatively, there may be more than one configured sub-bands carrying the DL control signal such as the assistance information. In other words, if the UE is configured with sub-bands SB1-SB5, the assistance information may be transmitted in at least one of the sub-bands SB2-SB5 in addition to the sub-band SB1. Therefore, the gNB may inform the UE of all resources that may carry the assistance information. Furthermore, the gNB may perform the Type 1 LBT having a longer sensing interval on any of the sub-bands in which the assistance information is intended to be sent.

Figure 13:
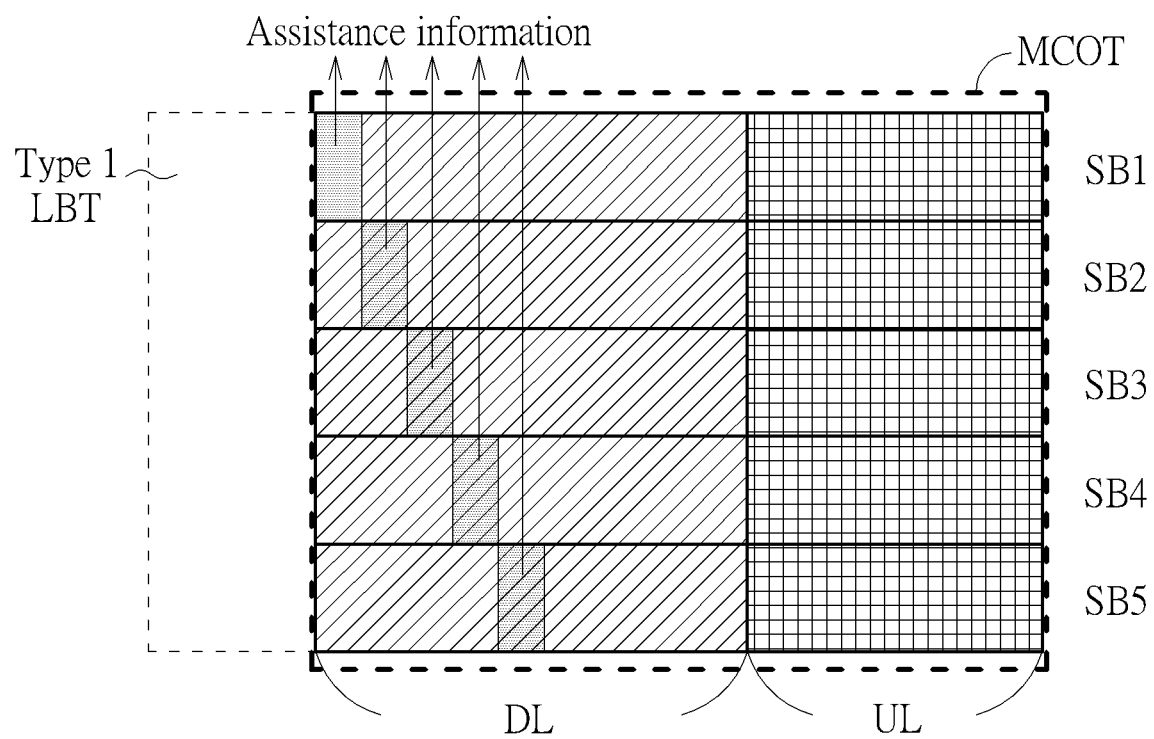
FIG. 13 is a schematic diagram of allocation of assistance information and channel occupancy according to an embodiment of the present invention.

Please refer to FIG. 13, which is a schematic diagram of allocation of assistance information and channel occupancy according to an embodiment of the present invention. As shown in FIG. 13, the gNB may perform the Type 1 LBT on all of the sub-bands SB1-SB5. In such a situation, the assistance information (i.e., the DL control signal) may be included in each of the sub-bands SB1-SB5. The UE may receive each of the time-frequency resources carrying the assistance information based on the configuration of common search space. Therefore, the UE may perform blind detection on the designated time-frequency locations. In this embodiment, the UE may first detect the sub-band SB1 to receive the assistance information. If the UE fails to receive this assistance information (the failure may occur due to LBT failure in the sub-band SB1, signal loss in the channel, or other reasons), the UE may detect the sub-band SB2 to receive another assistance information. In an embodiment, the assistance information carried in each sub-band may include availability information for all sub-bands configured to the UE; hence, the UE may stop detecting the assistance information if one of the assistance information is successfully received. Alternatively, the assistance information included in each sub-band may include information of channel occupancy allocation in the dedicated sub-band, and the UE should monitor all sub-bands that may carry the assistance information to obtain the entire information.

In another example, the DL control signal or the assistance information may be included in at least one of the frequency bands. The UE may be further configured by the gNB to monitor a search space in the at least one of the frequency bands in order to acquire the DL control signal, e.g., blindly detect the assistance information.

Preferably, the assistance information in the sub-bands is sent with time division multiplexing (TDM); that is, each of the assistance information may be configured to have different time-frequency allocations, as shown in FIG. 13. Considering the computation capability of the UE, the concurrently received assistance information may not be successfully detected or solved by the UE. The TDM scheme allows the UE to deal with one assistance information at a time.

Figure 14:
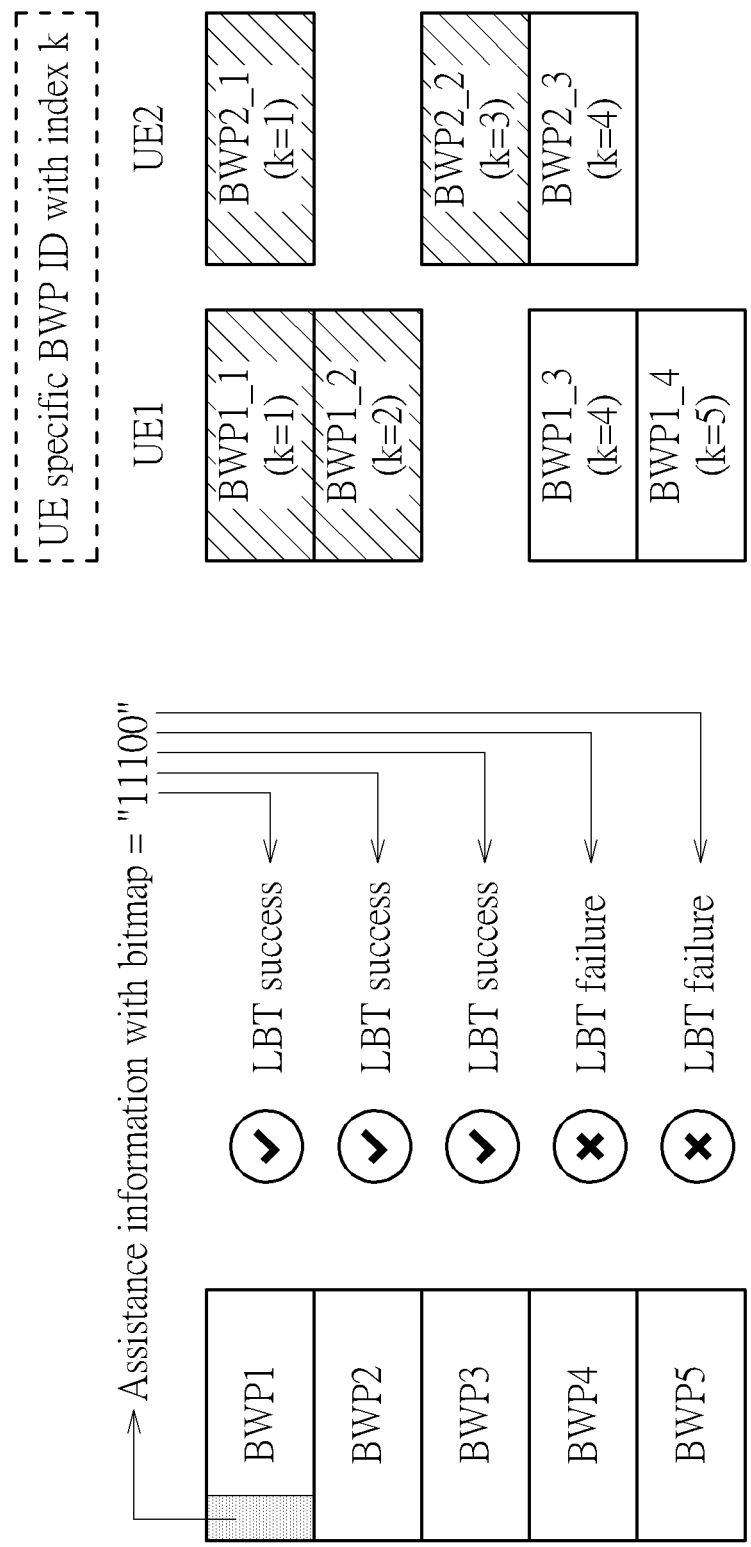
FIG. 14 is a schematic diagram of bandwidth allocation with BWPs for different UEs according to an embodiment of the present invention.

The abovementioned configurations of assistance information may also be implemented in the case where multiple BWPs of a cell are configured to the UE. Please refer to FIG. 14, which is a schematic diagram of bandwidth allocation with BWPs for different UEs according to an embodiment of the present invention. In such a situation, the LBT operation is performed in a unit of one BWP; hence, the assistance information may include a bitmap where each bit indicates the availability of one BWP. In this embodiment, the bitmap may be "11100", which indicates that the BWPs BWP1, BWP2 and BWP3 are available due to LBT success and the BWPs BWP4 and BWP5 are unavailable due to LBT failure.

In general, a cell of NR-U may be configured to serve multiple UEs, and the gNB may configure different UEs with different BWPs in a cell, to achieve load balance. During the configuration of BWPs, each UE may be configured with at least one BWP with at least one BWP ID via a higher layer signal, and each configured BWP is associated with a bit index in the assistance information applying the bitmap. For example, the UE UE1 is configured with 4 BWPs BWP1, BWP2, BWP4 and BWP5 with IDs BWP1_1, BWP1_2, BWP1_3 and BWP1_4, respectively, and these 4 BWPs BWP1, BWP2, BWP4 and BWP5 are configured with indices k=1, k=2, k=4 and k=5, respectively. When receiving the assistance information and obtaining the bitmap "11100", the UE UE1 may only consider the $1^{st}$, $2^{nd}$, $4^{th}$ and $5^{th}$ bits of the bitmap based on the indices of its configured BWPs. According to the received bitmap, the UE UE1 may know that the configured BWP IDs BWP1_1 and BWP1_2 are available. Similarly, the UE UE2 is configured with 3 BWPs BWP1, BWP3 and BWP4 with IDs BWP2_1, BWP2_2 and BWP2_3, respectively, and these 3 BWPs BWP1, BWP3 and BWP4 are configured with indices k=1, k=3 and k=4, respectively. When receiving the assistance information and obtaining the bitmap "11100", the UE UE2 may only consider the $1^{st}$, $3^{rd}$ and $4^{th}$ bits of the bitmap based on the indices of its configured BWPs. According to the received bitmap, the UE UE2 may know that the configured BWP IDs BWP2_1 and BWP2_2 are available.

As can be seen, the assistance information is a cell-specific information. As for the UEs served by the same cell, the gNB may transmit identical assistance information to these UEs, and different UEs may interpret the assistance information differently based on the configured BWPs.

Figure 15:
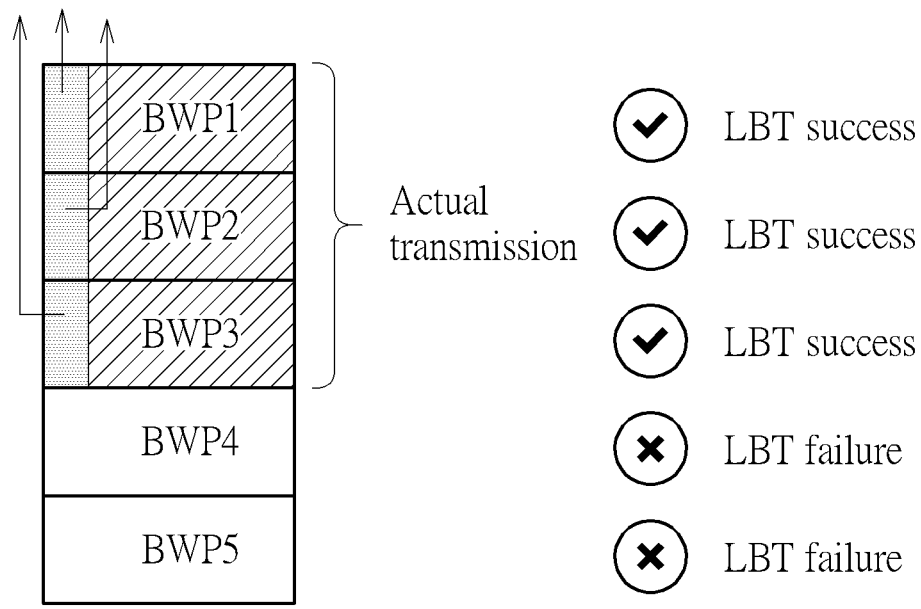
FIG. 15 is a schematic diagram of bandwidth allocation with BWPs according to an embodiment of the present invention.

Please refer to FIG. 15, which is a schematic diagram of bandwidth allocation with BWPs according to an embodiment of the present invention. As shown in FIG. 15, due to the LBT result, the actual transmission is performed on the BWPs BWP1-BWP3. In this embodiment, the DL signal from the gNB may not include bitmap or assistance information indicating the availability information of every configured sub-band. Therefore, the availability information of the BWPs is carried in DCI to be transmitted to the UE, and the DCI may be transmitted via each BWP determined to be available by the gNB, i.e., the DCI is included in the BWPs BWP1-BWP3. In such a situation, the UE is configured with a common search space in each of the configured BWPs, and requested to perform blind detection on the configured common search spaces. The UE may determine that a BWP is available if the DCI is detected in this BWP.

However, there is a large burden for a UE to perform blind detection on each BWP at the same time. In order to solve this problem, the gNB may pre-configure or pre-determine a leading BWP, and configure the UE to monitor the leading BWP first. The leading BWP may be selected by the gNB based on the channel quality and/or stability. If the UE successfully receives the DCI in the leading BWP, the UE then monitors the common search space in other BWP(s) to find the DCI; otherwise, if the UE fails to receive the DCI in the leading BWP, the UE may not monitor the common search space in other BWP(s). This reduces the complexity of blind detection performed by the UE. Note that this implementation may also be feasible in the case where the UE is configured with multiple sub-bands and the LBT operation is performed in a unit of one sub-band.

In another embodiment, the availability information for the configured BWPs or sub-bands may be included in a reference signal to be transmitted to the UE, and the reference signal may be transmitted via each BWP or sub-band determined to be available by the gNB. In such a situation, the UE is requested to detect each configured BWP or sub-band to receive the reference signal, and may determine that a BWP or sub-band is available if the reference signal is received in this BWP or sub-band. The gNB may configure a predetermined time-frequency resource that may carry the reference signal, and the UE may thereby detect the resource to receive the reference signal. The reference signal may include but not limited to a channel state information reference signal (CSI-RS) and/or a synchronization signal block (SSB).

Similarly, in order to reduce the detection complexity of the UE, the gNB may pre-configure or pre-determine a leading sub-band (or BWP), and configure the UE to detect the reference signal in the leading sub-band (or BWP) first. If the UE successfully receives the reference signal in the leading sub-band (or BWP), the UE then detects the reference signal in other sub-band(s) (or BWP(s)); otherwise, if the UE fails to receive the reference signal in the leading sub-band (or BTW), the UE may not detect the reference signal in other sub-band(s) (or BWP(s)). Additionally, in the leading sub-band, the UE may further detect and identify the DL control signal or assistance information that includes allocation of radio resource in the MCOT. If the reference signal and/or the assistance information is successfully received in the leading sub-band (or BTW), the UE may detect other sub-band(s) (or BWP(s)) to find the reference signal.

After the UE receives the assistance information and/or the related DL control signals, the UE may know which sub-bands may be available to receive signals and/or data. Therefore, the UE should be requested to perform blind detection to find the DCI in at least one valid search space, i.e., the search space (or the control resource set) in the available sub-band(s), to obtain the subsequent resource allocation for data reception. As mentioned above, if there are multiple UEs served by a cell, the gNB may configure the UEs with different sub-bands to reduce collision and achieve load balance. Therefore, the gNB may allocate different valid search space to different UEs, as specified by parameters such as a priority parameter and/or a number parameter. The priority parameter indicates that the UE may detect the DCI in a specific priority order. The number parameter indicates that the DCI may be allocated in a specific number of sub-bands, in which the UE is requested to find the DCI. The UE may perform DCI blind detection according to the indications provided in the priority parameter and the number parameter. The gNB may configure the same or different priority parameters and number parameters for each UE flexibly, in order to achieve load balance.

Figure 16:
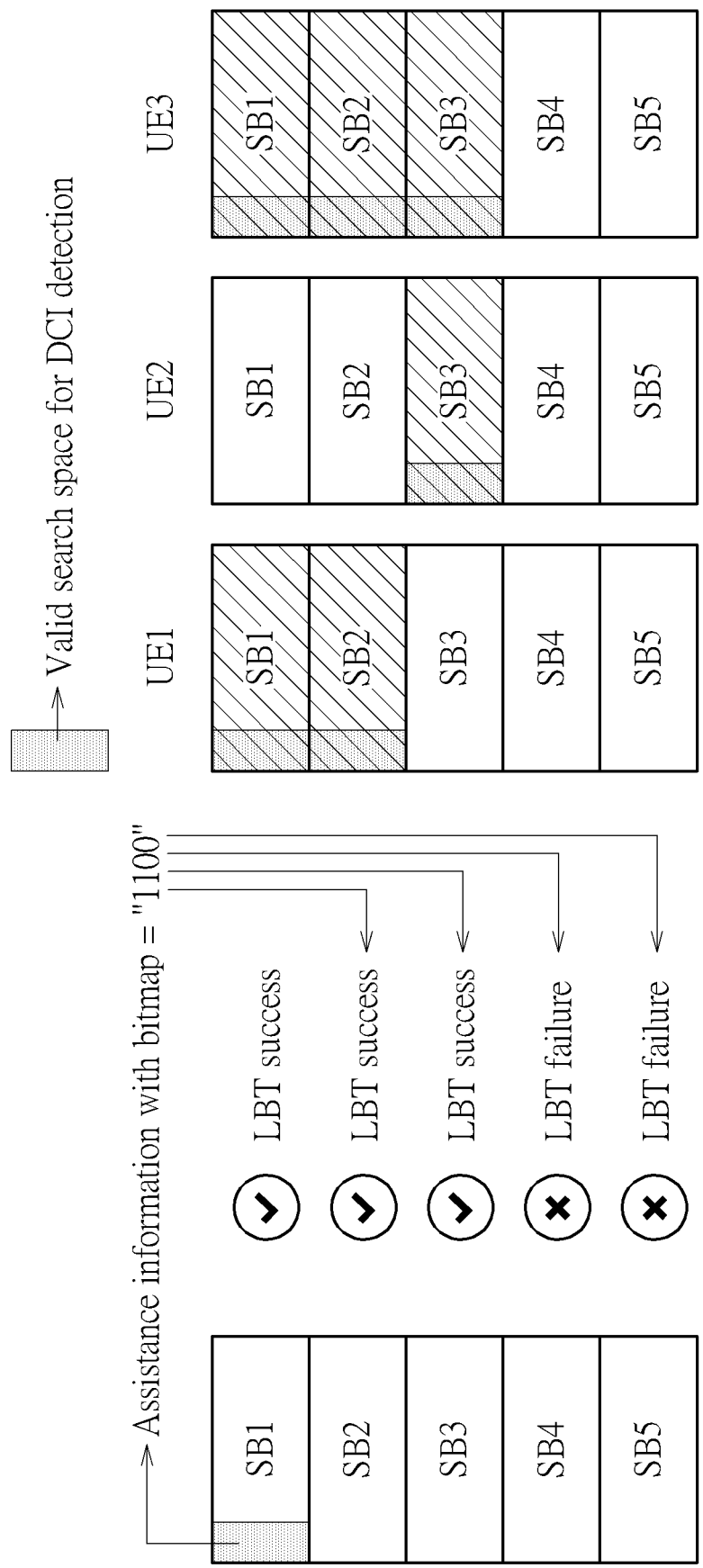
FIGS. 16-18 are schematic diagrams of allocation of valid search space for DCI detection according to an embodiment of the present invention.

Please refer to FIG. 16, which is a schematic diagram of allocation of valid search space for DCI detection according to an embodiment of the present invention. As shown in FIG. 16, there may be 3 UEs UE1-UE3 served by a gNB and configured with sub-bands SB1-SB5. The gNB performs LBT operation and determines that the sub-bands SB1-SB3 are available due to LBT success and the sub-bands SB4-SB5 are unavailable due to LBT failure. The assistance information is transmitted via the sub-band SB1 and includes a bitmap "1100" indicating the availability of other sub-bands SB2-SB5. According to the bitmap, the UEs UE1-UE3 may learn that the sub-bands SB1-SB3 are available and the sub-bands SB4-SB5 are not available. For each of the sub-bands SB1-SB5, the gNB may transmit the DCI or not according to the priority parameter(s) and the number parameter(s) and according to whether the sub-band is available or not.

The priority parameter configured to the UE UE1 is "12345", which indicates a priority order of sub-band IDs, and thus the DCI may be included in one or several of the sub-bands with the priority order of SB1, SB2, SB3, SB4, and SB5. The number parameter configured to the UE UE1 is "2", which means that there are 2 sub-bands including the DCI. According to the priority parameter and the number parameter, the gNB may configure the valid search space and include the DCI in the sub-bands SB1 and SB2, and the UE UE1 may perform DCI blind detection on the valid search space of the sub-bands SB1 and SB2 to receive the DCI (i.e., search the configured search space in the sub-bands SB1 and SB2), since the sub-bands SB1 and SB2 are both available.

As for the second UE UE2, the configured priority parameter is "43251" and the configured number parameter is "1". Although the sub-band SB4 has the highest priority among all configured sub-bands, the DCI may not be included in the sub-band SB4 because the sub-band SB4 is determined to be unavailable due to LBT failure. Instead, the gNB may configure the valid search space and include the DCI in the sub-band SB3 which has the highest priority among the available sub-bands. According to the received priority parameter and number parameter and the received assistance information which indicates the availability of each sub-band, the UE UE2 may perform DCI blind detection on the valid search space of the sub-band SB3 which has the highest priority among the available sub-bands.

As for the third UE UE3, the configured priority parameter is "34512" and the configured number parameter is "3". Based on similar criteria, the gNB may configure the valid search space and include the DCI in the sub-bands SB3, SB1 and SB2, which have higher priorities among the available sub-bands. Correspondingly, the UE UE3 may perform DCI blind detection on the valid search space of the sub-bands SB3, SB1 and SB2.

Preferably, different UEs may be configured with different priority parameters, which prevents or reduces collisions and/or congestions of DCI in a sub-band. The number parameter may be configured differently for different types of UEs. For example, if the UE usually has requirements of large data transmission and reception, the UE may be configured with a higher number parameter.

Figure 17:
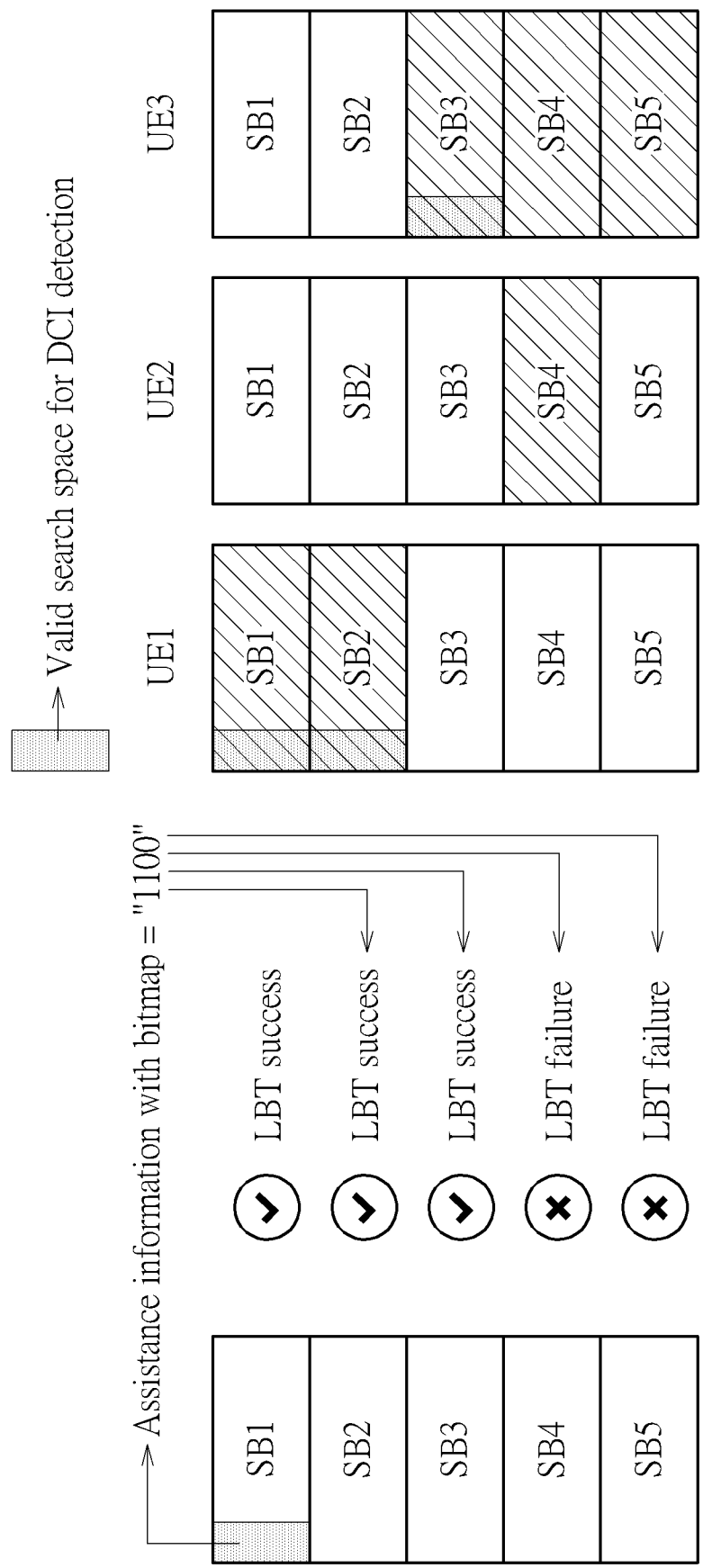

In other embodiments, the allocation of valid search space may be performed in other manners. For example, please refer to FIG. 17, which is a schematic diagram of another allocation of valid search space for DCI detection according to an embodiment of the present invention. Similarly, the gNB performs LBT operation and determines that the sub-bands SB1-SB3 are available due to LBT success and the sub-bands SB4-SB5 are unavailable due to LBT failure. The assistance information is transmitted to the UEs UE1-UE3 via the sub-band SB1 and includes a bitmap "1100" indicating the availability of other sub-bands SB2-SB5. In this embodiment, the UE UE1 is configured with the priority parameter "12345" and the number parameter "2", the UE UE2 is configured with the priority parameter "43251" and the number parameter "1", and the UE UE3 is configured with the priority parameter "34512" and the number parameter "3".

In detail, as for the first UE UE1, the gNB may try to transmit the DCI in the sub-bands SB1 and SB2 according to the priority parameter "12345" and the number parameter "2". Since both of the sub-bands SB1 and SB2 are available, the DCI may be transmitted in the sub-bands SB1 and SB2. Correspondingly, the UE UE1 may perform DCI blind detection on the valid search space of the sub-bands SB1 and SB2. As for the second UE UE2, the gNB may try to transmit the DCI in the sub-band SB4 according to the priority parameter "43251" and the number parameter "1". Since the sub-band SB4 having the highest priority is unavailable, the gNB may not include DCI or valid search space in the sub-bands within this NR-U burst; that is, the gNB may not serve this UE in this burst. Correspondingly, the UE UE2 may not perform DCI blind detection in this NR-U burst. As for the third UE UE3, the gNB may try to transmit the DCI in the sub-bands SB3, SB4 and SB5 according to the priority parameter "34512" and the number parameter "3". Among the sub-bands SB3, SB4 and SB5, the sub-band SB3 is available and the sub-bands SB4 and SB5 are not available; hence, the DCI may be transmitted in the sub-band SB3. Correspondingly, the UE UE3 may perform DCI blind detection on the valid search space of the sub-band SB3.

In an embodiment, if there is no valid search space obtained by a UE based on the priority parameter, number parameter and assistance information (such as the UE UE2 shown in FIG. 17), the UE may still perform DCI blind detection on the leading sub-band that carries the assistance information. In addition, the above priority parameter and number parameter may also be applicable for the UE to receive any type of DL signal in addition to the DCI.

Figure 18:
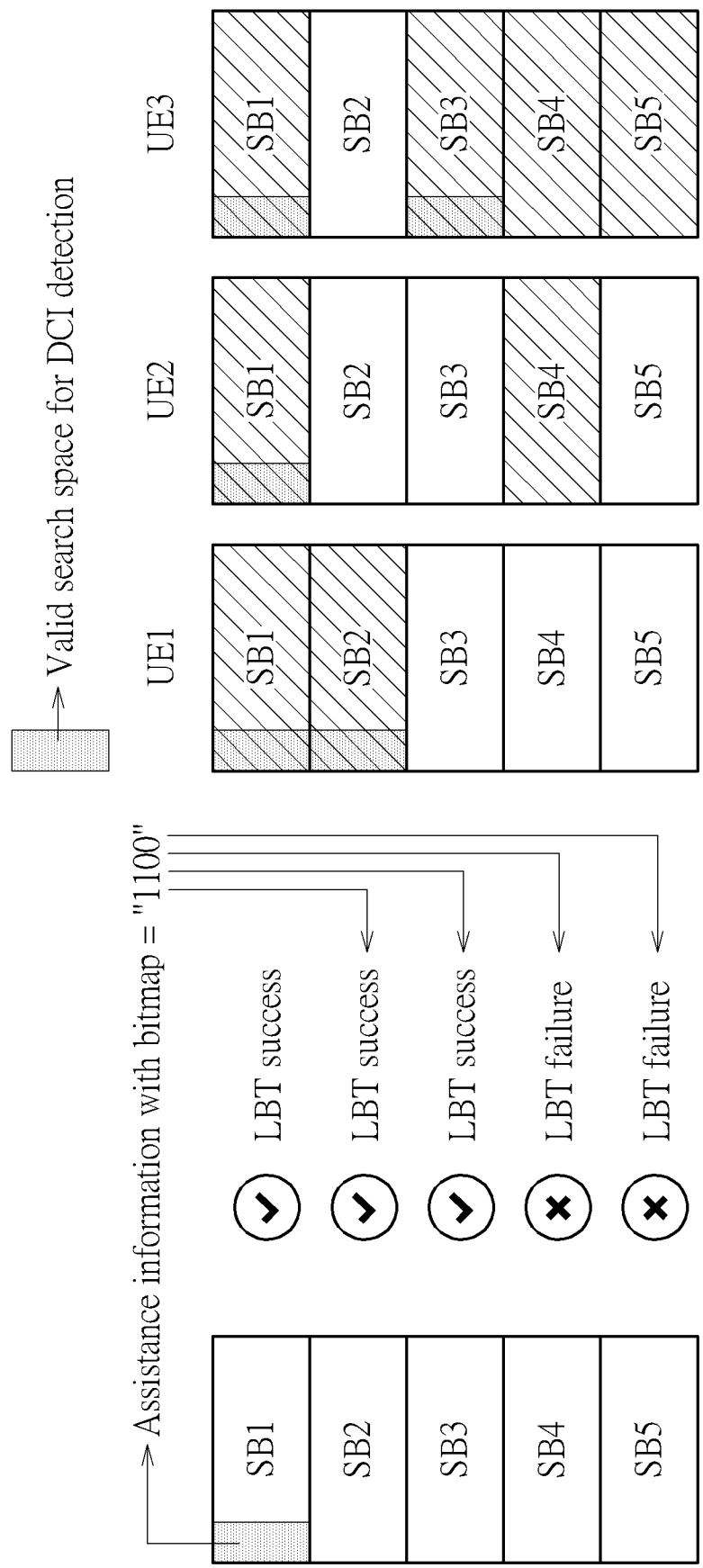

Please refer to FIG. 18, which is a schematic diagram of a further allocation of valid search space for DCI detection according to an embodiment of the present invention. The configurations of the sub-bands and priority and number parameters for the UEs UE1-UE3 and the LBT results are identical to the above embodiments, and thus omitted herein. In this embodiment, the assistance information is transmitted via the leading sub-band SB1, and thus the UE may infer that the sub-band SB1 is available when the assistance information is received. In such a situation, the DCI is transmitted in the sub-band SB1, and correspondingly, the UE is configured to perform DCI blind detection on the valid search space of the sub-band SB1. For other sub-bands SB2-SB5, the gNB may transmit the DCI or not according to the priority parameter(s) and the number parameter(s) and according to whether the sub-band is available or not as the criteria described above, and the UE may perform DCI blind detection in a corresponding manner. As shown in FIG. 18, the UE UE1 may perform DCI blind detection on the sub-bands SB1 and SB2, the UE UE2 may perform DCI blind detection on the sub-band SB1, and the UE UE3 may perform DCI blind detection on the sub-bands SB1 and SB3.

In another embodiment, the sub-bands having valid search space may be represented as a priority list; that is, the information transmitted to the UE may include a list of sub-bands having the search space where the DCI may be transmitted. In other words, the priority list may replace the priority parameter and the number parameter configured to the UE. For example, in the embodiment as shown in FIG. 16, the UE UE1 may be configured with a priority list "1 2", the UE UE2 may be configured with a priority list "4", and the UE UE3 may be configured with a priority list "3 4 5". Therefore, the UEs may check if the sub-band(s) in the list is available, and thereby perform DCI blind detection on the available sub-band(s). As for the UE UE2, there is no valid search space obtained; hence, the UE UE2 may not perform DCI blind detection in the NR-U burst, or perform DCI blind detection on the leading sub-band SB1.

The gNB may schedule the time-frequency resource and send the scheduling information via the DCI. Therefore, after the DCI is received by the UE, the UE may obtain the scheduling information and determine at least one valid resource for UL and/or DL operation. In order to prevent or reduce collisions and/or congestions of data transmission in a sub-band, the gNB may schedule the resources differently for different UEs; hence, each UE may receive a dedicated DCI for obtaining a UE-specific resource scheduling. Further, in the unlicensed spectrum the LBT operation is necessary, and the operations of scheduling DL and UL resources may be performed or not according to whether the sub-band is available or not; that is, the scheduling operations may be performed only in the available sub-band(s).

Figure 19:
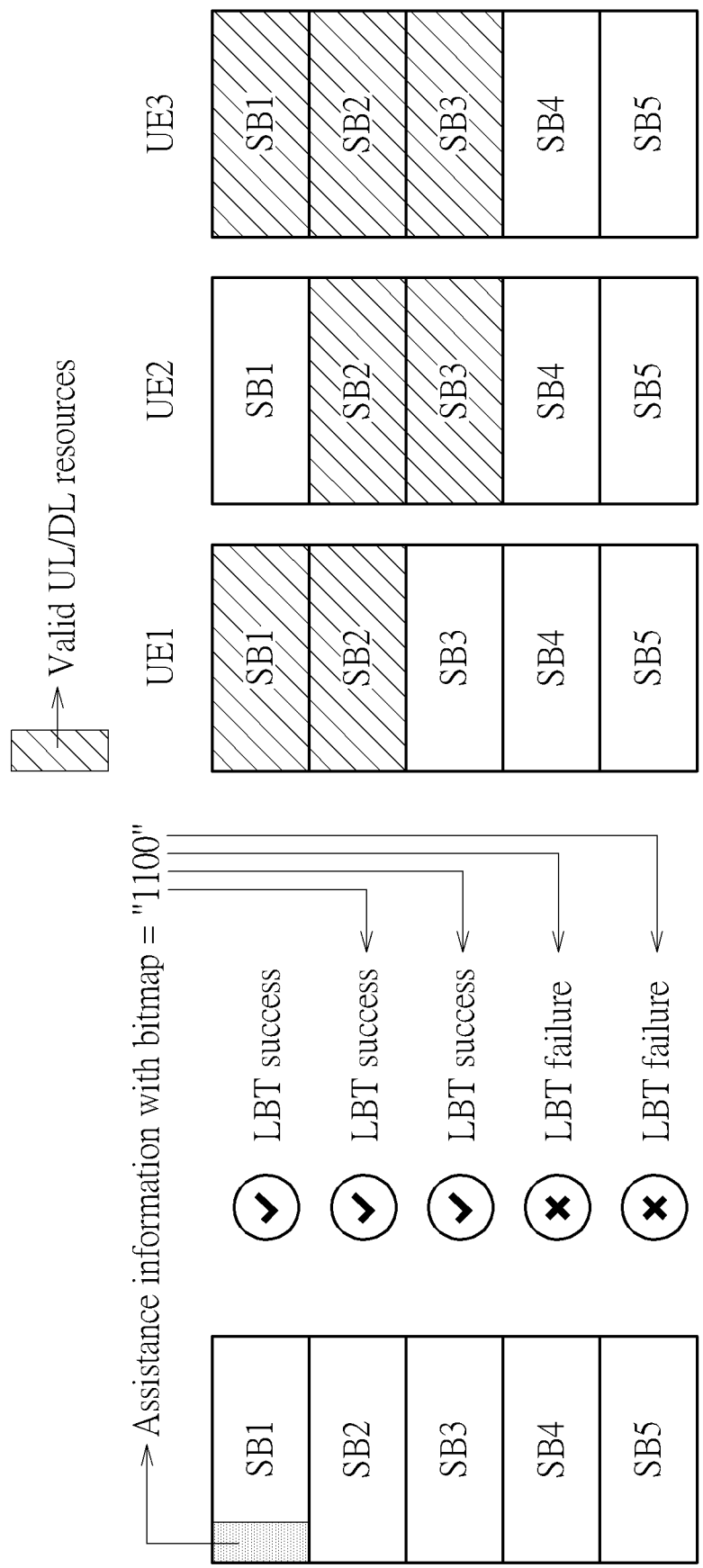
FIG. 19 is a schematic diagram of allocation of UL/DL resources according to an embodiment of the present invention.

Similarly, the DCI may include a priority parameter and a number parameter indicating which sub-band(s) is scheduled to perform UL and/or DL operation. Please refer to FIG. 19, which is a schematic diagram of allocation of UL/DL resources according to an embodiment of the present invention. The configurations of the sub-bands and related LBT results are identical to the above embodiments, and thus omitted herein. A similar configuration of priority parameter and number parameter is also applicable for the scheduling of UL/DL resources based on the DCI. In this embodiment, the UE UE1 is configured with the priority parameter "12345" and the number parameter "2", the UE UE2 is configured with the priority parameter "43251" and the number parameter "2", and the UE UE3 is configured with the priority parameter "34512" and the number parameter "3".

In detail, as for the first UE UE1, the gNB may try to schedule the UL/DL resources in the sub-bands SB1 and SB2 according to the priority parameter "12345" and the number parameter "2". Since both of the sub-bands SB1 and SB2 are available, the DCI for UE1 may indicate that the UL/DL resources are scheduled in the sub-bands SB1 and SB2. Correspondingly, the UE UE1 may perform UL/DL operations on the available sub-bands SB1 and SB2 according to the received DCI. As for the second UE UE2, the gNB may schedule the UL/DL resources according to the priority parameter "43251" and the number parameter "2" and also according to the availability of the sub-bands SB1-SB5. That is, the gNB may schedule the UL/DL resources on the sub-band(s) which has the highest priority among the available sub-bands. In this embodiment, the gNB may schedule the UL/DL resources in two sub-bands SB3 and SB2 having higher priorities. Correspondingly, the UE UE2 may perform UL/DL operations on the available sub-bands SB3 and SB2 according to the received DCI. As for the third UE UE3, the gNB may schedule the UL/DL resources according to the priority parameter "34512" and the number parameter "3" and also according to the availability of the sub-bands SB1-SB5. In this embodiment, the gNB may schedule the UL/DL resources in three sub-bands SB3, SB1 and SB2 having higher priorities.

Figure 20:
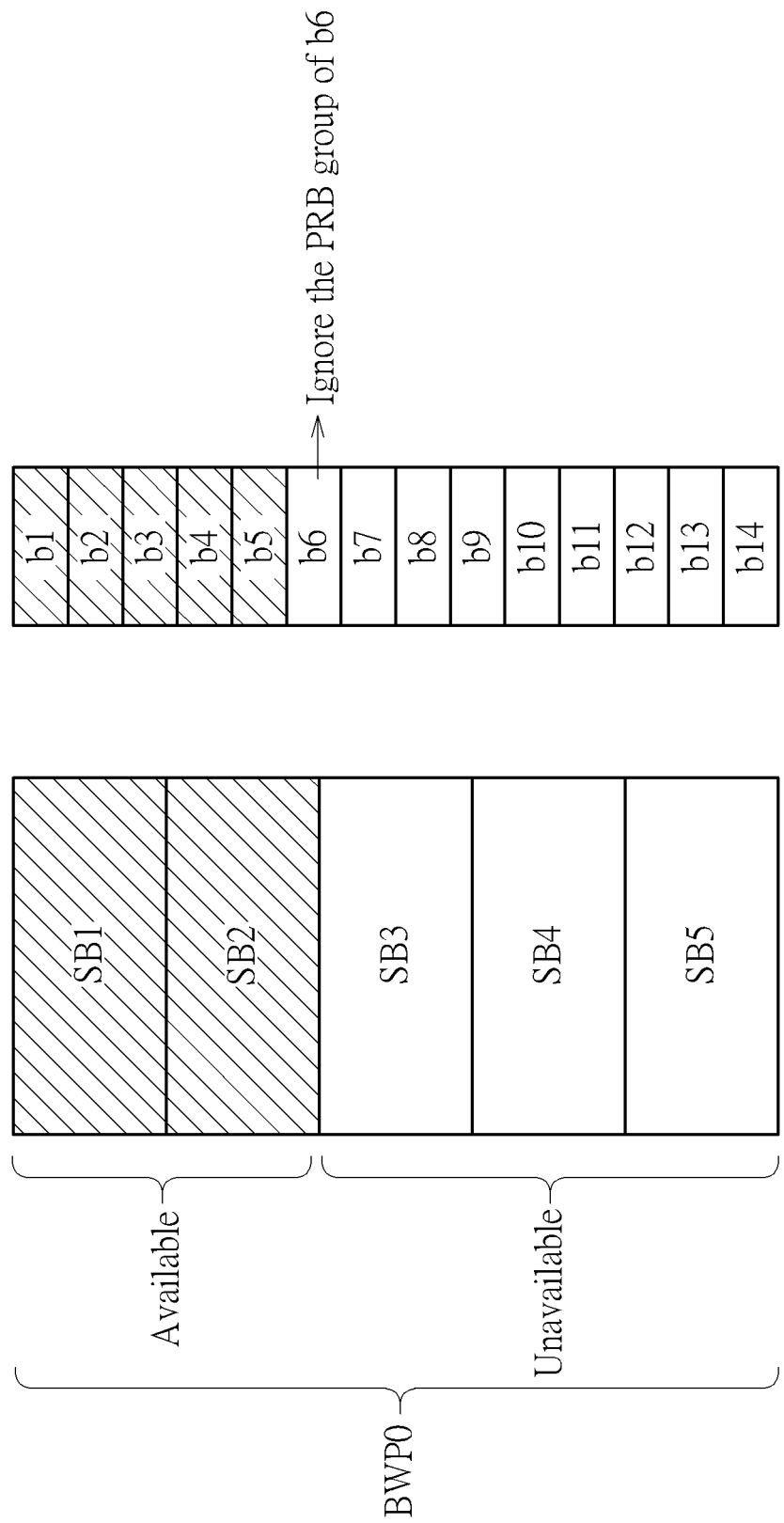
FIG. 20 is a schematic diagram of allocation of sub-bands and PRBs in a BWP according to an embodiment of the present invention.

The DCI may perform resource scheduling with a unit of physical resource block (PRB) group in frequency domain. Please refer to FIG. 20, which is a schematic diagram of allocation of sub-bands and PRBs in a BWP BWP0 according to an embodiment of the present invention. As shown in FIG. 20, the BWP BWP0 is separated into 5 sub-bands SB1-SB5, and the sub-bands SB1-SB2 are determined to be available due to LBT success and the sub-bands SB3-SB5 are determined to be unavailable due to LBT failure. In the BWP BWP0, a bitmap (including b1-b14) is utilized to represent the resource allocation in frequency domain scheduled by the DCI. The length of the bitmap may be determined according to the size of the BWP and each bit in the bitmap may represent a group of PRBs to indicate whether the group of PRBs is assigned for DL or UL operation. The number of PRBs within a PRB group may be configured by the gNB, and determined according to the BWP size and/or a lookup table. In this embodiment, the BWP BWP0 includes 14 bits b1-b14 in the bitmap.

One bit (one PRB group) of the bitmap may correspond to multiple sub-bands. As shown in FIG. 20, the bit b6 corresponds to the sub-bands SB2 and SB3; that is, the PRB group overlaps a part of the sub-band SB2 and a part of the sub-band SB3. In detail, there may be two PRBs in the PRB group of b6 mapping to the sub-band SB2, and another one PRB in the PRB group of b6 mapping to the sub-band SB3, as shown in FIG. 20. However, according to the LBT result, the sub-band SB2 is available and the sub-band SB3 is unavailable. In an embodiment, if a PRB group has a part mapping to an unavailable sub-band, the UE may be configured to ignore the PRB group, since the received PRB group may not be complete due to the LBT result. For example, in the BWP BWP0, the PRB group of b6 may be ignored by the UE. In another embodiment, each resource block in a PRB group may be considered separately. If a resource block has a part mapping to an unavailable sub-band, the UE may be configured to ignore the resource block, while other resource blocks in the same PRB group may be received if these resource blocks are entirely mapping to available sub-band(s).

Please note that the above method of DCI scheduling based on availability of sub-bands is also applicable to the case where the UE is configured with multiple BWPs and the LBT operation is performed in a unit of one BWP. For example, for a NR-U burst, the UE may perform DCI blind detection for at least one available BWP, and different UEs may be configured with a dedicated priority parameter and number parameter indicating the allocation of UL/DL operations, i.e., DL assignments and UL grants. Note that the DCI for each BWP may have the same or different sizes according to the size of BWP. In other words, a larger BWP may be scheduled by a larger DCI. In addition, a DCI for scheduling a BWP may be transmitted in the BWP itself or transmitted in another BWP configured by the gNB.

After receiving the DCI, the UE may receive DL data via a physical DL shared channel (PDSCH) indicated by the DL assignment of the DCI. In an embodiment, if the PDSCH is scheduled in a sub-band which is determined to be unavailable due to LBT failure, the UE may be configured to ignore the PDSCH. In an embodiment, the PDSCH may be scheduled in multiple sub-bands. If the UE determines that a part of the PDSCH is scheduled in an unavailable sub-band, the UE may skip decoding the PDSCH. Since the UE ignores the PDSCH or skips decoding the PDSCH, the UE may not transmit an ACK for the PDSCH. Alternatively, the UE may return a NACK for the PDSCH.

In another embodiment, if the UE determines that a part of the PDSCH is scheduled in an unavailable sub-band (while another part of the PDSCH is scheduled in an available sub-band), the UE may check if the effective coding rate of a transport block (TB) transmitted in the PDSCH is larger than a predetermined value. In general, the UE may obtain the data size or TB size from the received DCI. Based on the data size and the actually received data, and considering the TB size, cyclic redundancy check (CRC) bits, modulation order and/or available resource for transmitting the TB, the UE may determine the effective coding rate. The UE may thereby determine whether the data can be correctly decoded based on the effective coding rate. For example, a threshold value 0.95 may be predetermined. The UE may determine whether the effective coding rate of the TB transmitted in the PDSCH is larger than 0.95. If the effective coding rate is larger than 0.95, the UE may skip decoding the PDSCH and thereby return a NACK or not return an ACK. If the effective coding rate is less than 0.95, the UE may try to decode the PDSCH to receive DL data.

As mentioned above, the UE may perform UL and DL operations according to DCI scheduling and availability of sub-bands or BWPs. The availability of sub-bands and BWPs is determined based on the LBT operation performed by the gNB. If the LBT result indicates that a sub-band passes the LBT check, the sub-band may be determined to be available and the gNB may perform DL scheduling on the sub-band. If a sub-band is determined to be unavailable due to LBT failure, the gNB may not perform DL transmission on the sub-band. In an embodiment, as for the sub-band determined to be unavailable by the gNB, the UE may still perform another LBT check on this sub-band and thereby perform UL transmission if the sub-band passes this LBT check. In such a situation, even if the sub-band does not pass the LBT check performed by the gNB, the gNB may still configure the DCI to allocate a UL grant resource in the sub-band, and the UE may further perform a LBT operation before the UL transmission on this UL resource. As mentioned above, the DL control signal such as the assistance information received by the UE includes information indicating the allocation of DL/UL resources in the sub-band; hence, the UL resource may be configured to the UE no matter whether the sub-band passes the LBT check performed by the gNB. It should be noted that a sub-band that fails to pass an LBT check performed by the gNB may still pass an LBT check performed by the UE.

Figure 21:
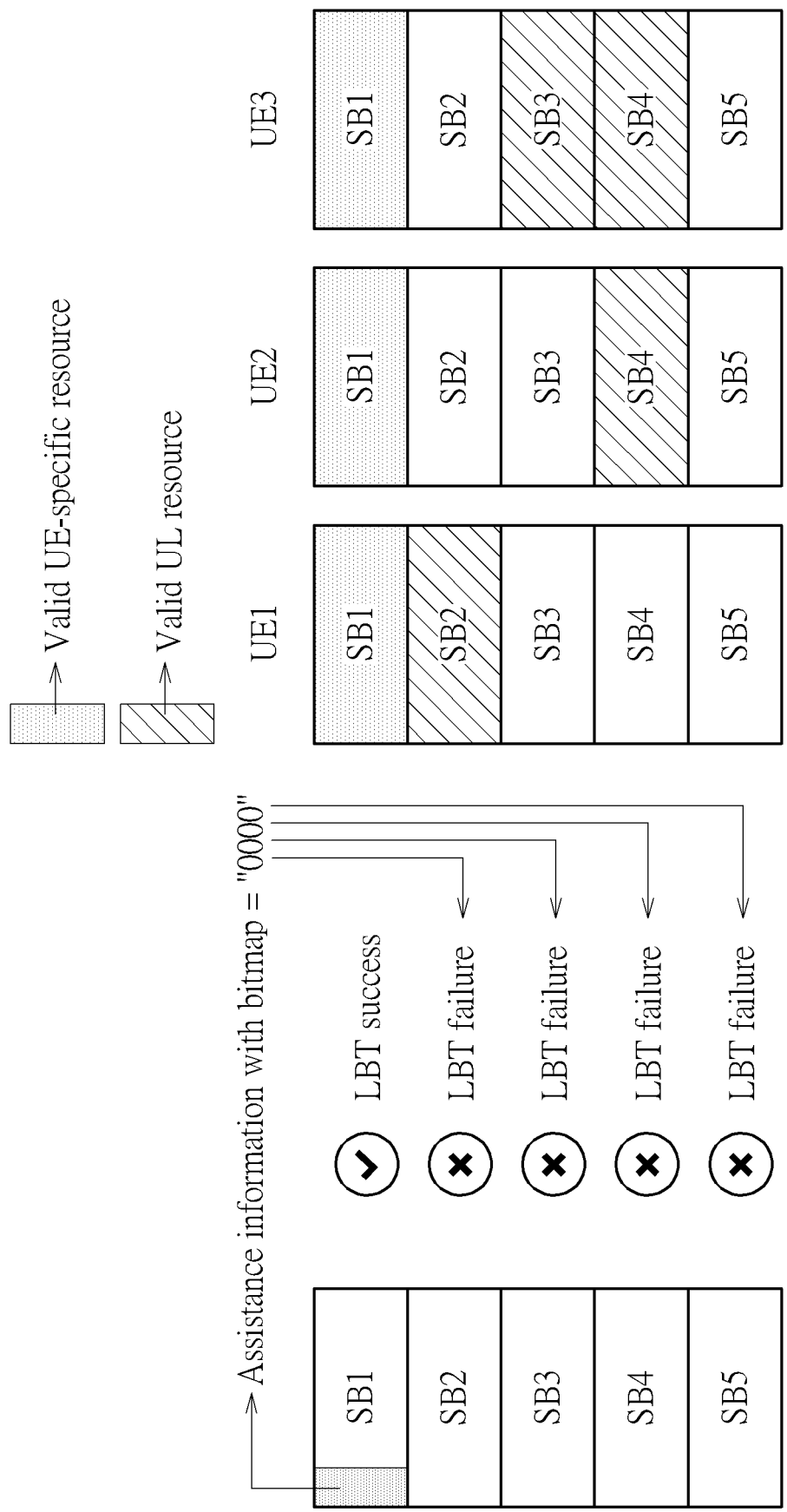
FIGS. 21 and 22 are schematic diagrams of allocation of UL resource according to an embodiment of the present invention.

Please refer to FIG. 21, which is a schematic diagram of allocation of UL resource according to an embodiment of the present invention. As shown in FIG. 21, the gNB may perform LBT operation and determine that the sub-band SB1 is available due to LBT success and the sub-bands SB2-SB5 are unavailable due to LBT failure. The assistance information is transmitted to the UEs UE1-UE3 via the sub-band SB1 and includes a bitmap "0000" indicating the availability of other sub-bands SB2-SB5. In this embodiment, the UE UE1 is configured with the priority parameter "12345" and the number parameter "2", the UE UE2 is configured with the priority parameter "43251" and the number parameter "2", and the UE UE3 is configured with the priority parameter "34512" and the number parameter "3".

In detail, as for the first UE UE1, the gNB may schedule the UL resource according to the priority parameter "12345" and the number parameter "2" and also according to the availability of the sub-bands SB1-SB5. That is, the gNB may schedule UE-specific resources in the sub-band SB1 which is the leading sub-band, and may also schedule UL resources in the sub-band SB2 which has the highest priority among the unavailable sub-bands. Correspondingly, the UE UE1 may perform an LBT operation for UL transmission on the sub-band SB2. As for the second UE UE2, the gNB may schedule the UL resource according to the priority parameter "43251" and the number parameter "2" and also according to the availability of the sub-bands SB1-SB5. That is, the gNB may schedule UE-specific resources in the sub-band SB1 which is the leading sub-band, and may also schedule UL resources in the sub-band SB4 which has the highest priority among the unavailable sub-bands. Correspondingly, the UE UE2 may perform an LBT operation for UL transmission on the sub-band SB4. As for the third UE UE3, the gNB may schedule the UL resource according to the priority parameter "34512" and the number parameter "3" and also according to the availability of the sub-bands SB1-SB5. That is, the gNB may schedule UE-specific resources in the sub-band SB1 which is the leading sub-band, and may also schedule UL resources in the sub-bands SB3 and SB4 which have higher priority among the unavailable sub-bands. Correspondingly, the UE UE3 may perform an LBT operation for UL transmission on the sub-bands SB3 and SB4.

Figure 22:
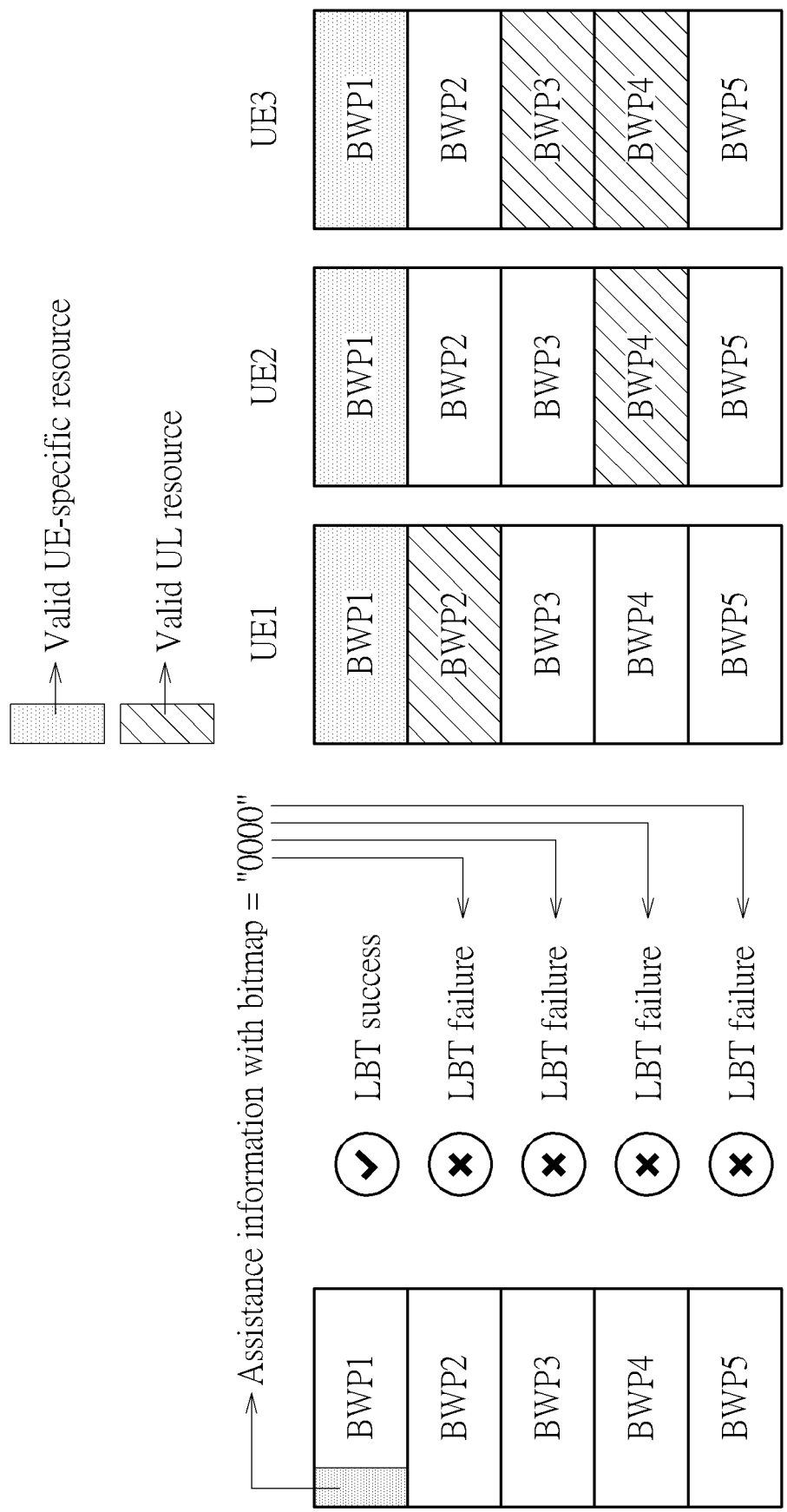

Please note that the gNB may configure the UE to perform an LBT operation or not before a UL transmission is performed by the UE. For example, if the start of UL transmission is earlier and closer to the time of the gNB performing the LBT operation, the UE may not need to perform an LBT operation, or a short sensing LBT (e.g., the Type 2 LBT) may be enough for the UE. If the UL transmission starts after a long-term DL transmission, a long sensing LBT (e.g., the Type 1 LBT) may be necessary. As for the UL transmission on a sub-band determined to be unavailable by the gNB, the long sensing LBT may also be necessary since the sub-band does not pass the LBT check performed by the gNB. The gNB may inform the UE whether to perform LBT and/or which type of LBT should be performed when configuring the UL grant. In addition, the above implementations of UL resource allocation are applicable to the case where multiple BWPs of a cell are configured to the UE and the LBT operation is performed in a unit of one BWP, as shown in FIG. 22. The detailed operations related to FIG. 22 are similar to those described above, except that the sub-bands SB1-SB5 are replaced by the BWPs BWP1-BWP5; hence, the related details will be omitted herein.

After receiving the DCI, the UE may perform UL transmission via a physical UL shared channel (PUSCH) indicated by the UL grant of the DCI. In an embodiment, if the LBT result for the PUSCH resource is failed, the UE may stop performing UL transmission via the PUSCH. In an embodiment, the PUSCH may be scheduled in multiple sub-bands. If the UE determines that a part of the PUSCH is scheduled in a sub-band which does not pass the LBT check performed by the UE (i.e., the LBT result for a part of the PUSCH resource is failed), the UE may stop performing UL transmission via the PUSCH, while the UL transmission may still be performed on the part passing the LBT check.

In another embodiment, if the UE determines that the LBT result for a part of the PUSCH is failed (while the LBT result for another part of the PUSCH is successful), the UE may check if the effective coding rate of a TB transmitted in the PUSCH is larger than a predetermined value. For example, a threshold value 0.95 may be predetermined. The UE may determine whether the effective coding rate of the TB transmitted in the PUSCH is larger than 0.95. If the effective coding rate is larger than 0.95, the UE may stop performing UL transmission via the PUSCH.

In each sub-band, the UE may be configured with at least one grant resource to perform UL transmission autonomously in each sub-band. In the grant resource, the UE may still perform UL transmission even if the sub-band of the grant resource is determined to be unavailable due to LBT failure performed by the gNB. The configured grant resource may be represented by a set of time-frequency resource(s), and may have the same or different sizes. The grant resource may be configured via a higher layer signal and/or a physical layer signal. The gNB is capable of configuring the grant resources for different UEs flexibly. For example, the gNB may configure multiple UEs in a cell, and the UEs served by the same cell may be configured with different grant resources or different grant resources may be triggered for different UEs, in order to prevent LBT failure due to UL transmission of a nearby UE.

Figure 23:
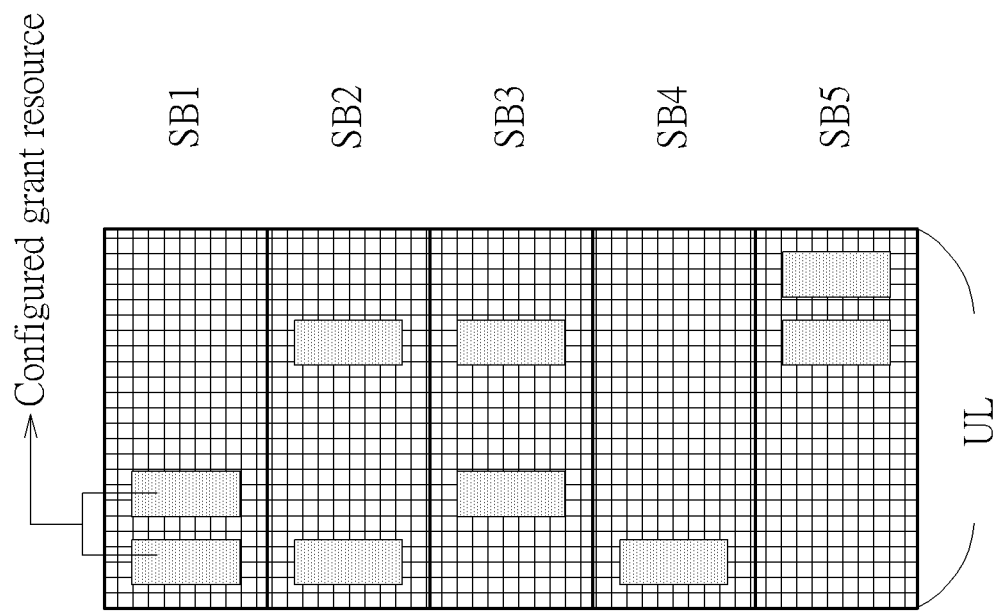
FIG. 23 is a schematic diagram of configured grant resources in the sub-bands according to an embodiment of the present invention.

For example, as shown in FIG. 23, the UE is configured with 5 sub-bands SB1-SB5 having UL slots. Among these sub-bands SB1-SB5, each of the sub-bands SB1, SB2, SB3 and SB5 includes 2 configured grant resources, and the sub-band SB4 includes 1 configured grant resource.

Figure 24:
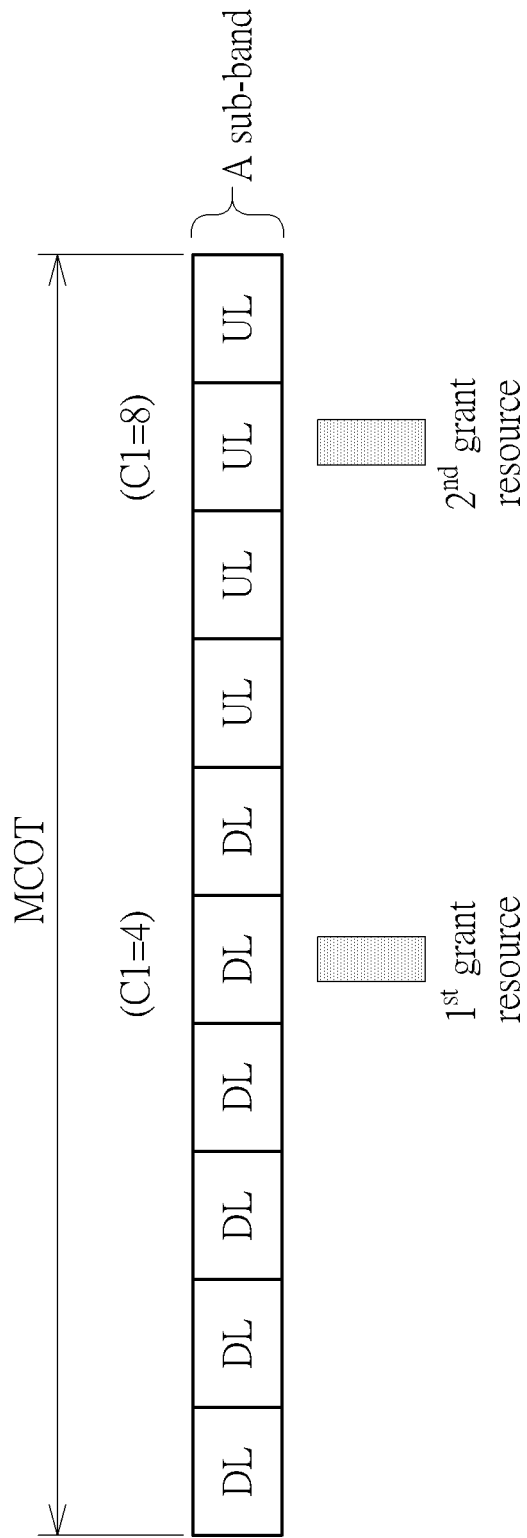
FIGS. 24 and 25 are schematic diagrams of allocation of UL and DL resources in a sub-band and related configuration of the grant resources.

In an embodiment, a configured grant resource may be indicated by a control signal, which includes a parameter C1 indicating an offset with a burst timing such as the start of the NR-U transmission burst. For example, please refer to FIG. 24, which is a schematic diagram of allocation of UL and DL resources in a sub-band and related configuration of the grant resources. As shown in FIG. 24, the first grant resource is in the $5^{th}$ time slot of the MCOT, and the parameter C1 may equal 4 to indicate that this grant resource is configured in the $5^{th}$ time slot as the start of the NR-U transmission burst (the $1^{st}$ time slot) plus an offset of 4 slots. The second grant resource is in the $9^{th}$ time slot of the MOOT, and the parameter C1 may equal 8 to indicate that this grant resource is configured in the $9^{th}$ time slot as the start of the NR-U transmission burst (the $1^{st}$ time slot) plus an offset of 8 slots. When the UE receives the configuration of the grant resources, the UE may determine that the first grant resource is in a DL slot, and may not perform UL transmission via the first grant resource (this grant resource is invalid). The UE may then determine that the second grant resource is in a UL slot, and the second grant resource is a valid grant resource for the UE. In other words, the time-frequency allocation of the grant resources is determined based on the NR-U transmission burst. For example, the start of the NR-U transmission burst may be determined according to the DL control signal.

Figure 25:
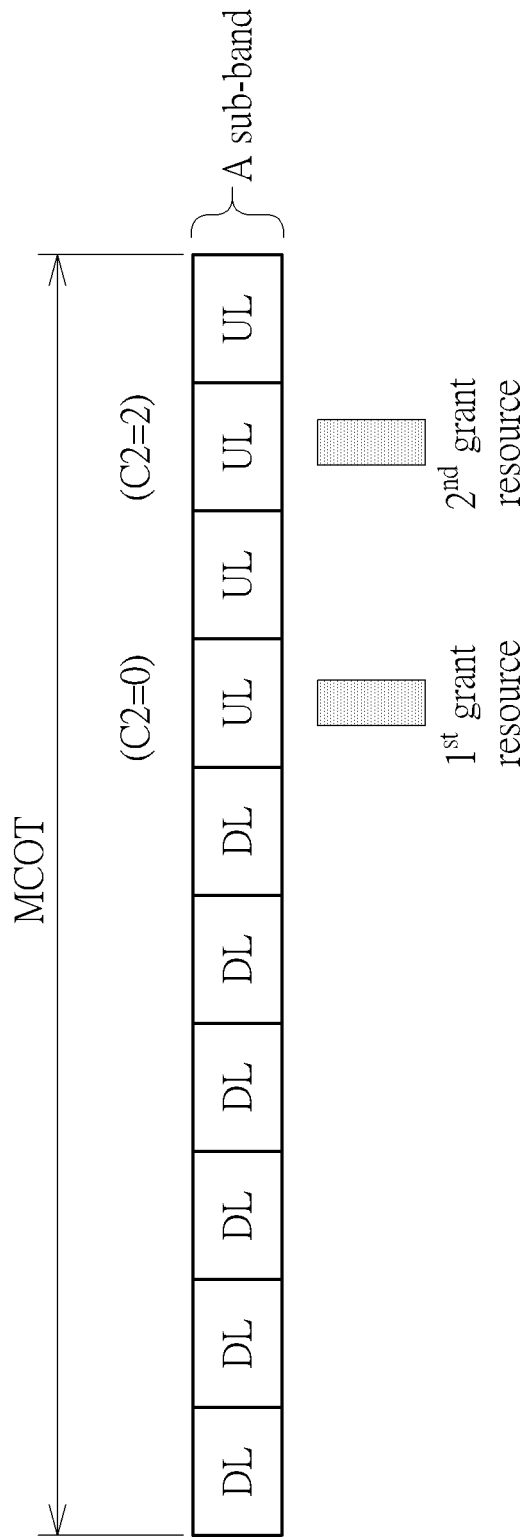

In an alternative embodiment, the control signal for configuring the grant resource may include another parameter C2 indicating an offset with another burst timing such as the start of UL resources. For example, please refer to FIG. 25, which is a schematic diagram of allocation of UL and DL resources in a sub-band and another related configuration of the grant resources. As shown in FIG. 25, the sub-band is allocated with 6 DL slots followed by 4 UL slots. The first grant resource is in the $7^{th}$ time slot (the $1^{st}$ UL slot) of the MCOT, and the parameter C2 may equal 0 to indicate that this grant resource is configured in the $7^{th}$ time slot as the start of the UL burst (the $7^{th}$ time slot) plus an offset of 0 slots. The second grant resource is in the $9^{th}$ time slot (the $3^{rd}$ UL slot) of the MCOT, and the parameter C2 may equal 2 to indicate that this grant resource is configured in the $9^{th}$ time slot as the start of the UL burst (the $7^{th}$ time slot) plus an offset of 2 slots. In this embodiment, the time-frequency allocation of the grant resources is determined based on not only the NR-U transmission burst but also the DL/UL allocation in this NR-U transmission burst. For example, the start of the UL burst may be determined according to the DL control signal. For another example, the start of the UL burst is the first UL resource of the NR-U transmission burst.

In another alternative embodiment, the control signal for configuring the grant resource may indicate the time-frequency allocation of the grant resource with a periodicity and a shift corresponding to a system frame number. This is applicable to periodic grant resources configured in a sub-band.

In a further alternative embodiment, the grant resource(s) may be configured with a value which indicates the number and position of the configured grant resource in a sub-band within the NR-U transmission burst according to a table. The gNB may transmit a control signal including the value to the UE, in order to indicate a set of configured grant resource(s) according to the table. The values for different sub-bands may be the same or different. Table 1 illustrates an exemplary table with several values mapping to the numbers and positions of configured grant resources, as shown below.

TABLE 1

| Value | Configured grant | Description |
|---|---|---|
| 0 | {0} | No available configured grant resource |
| 1 | {4, 8} | 2 configured grant resources, slots {4, 8} |
| 2 | {1, 4, 7} | 3 configured grant resources, slots {1, 4, 7} |
| 3 | {2} | 1 configured grant resource, slot {2} |
| 4 | {2, 4, 6} | 3 configured grant resource, slots {2, 4, 6} |
| 5 | {8, 9} | 2 configured grant resource, slots {8, 9} |

In an embodiment, the UE may determine whether a configured grant resource is triggered to allow autonomous UL transmission according to the availability state of the corresponding sub-band. For example, if the sub-band carrying the grant resource is unavailable, the UE may consider that the grant resource is triggered. Since the grant resource has been configured by the gNB, it is preferable to perform UL transmission in the UL slots of the unavailable sub-band, in order to improve the transmission efficiency and reduce a waste of the resource. Thus, the grant resource(s) in the unavailable sub-band(s) may further be triggered. As mentioned above, the UL transmission in such a configured grant resource requires an LBT operation performed by the UE. In an embodiment, the UE may perform autonomous UL transmission on the configured grant resource(s) of at least one of the unavailable sub-bands, and the at least one unavailable sub-band may be selected in any manner, e.g., according to a priority rule applying a priority parameter and a number parameter as mentioned above, and/or according to an indication from the gNB.

Figure 26:
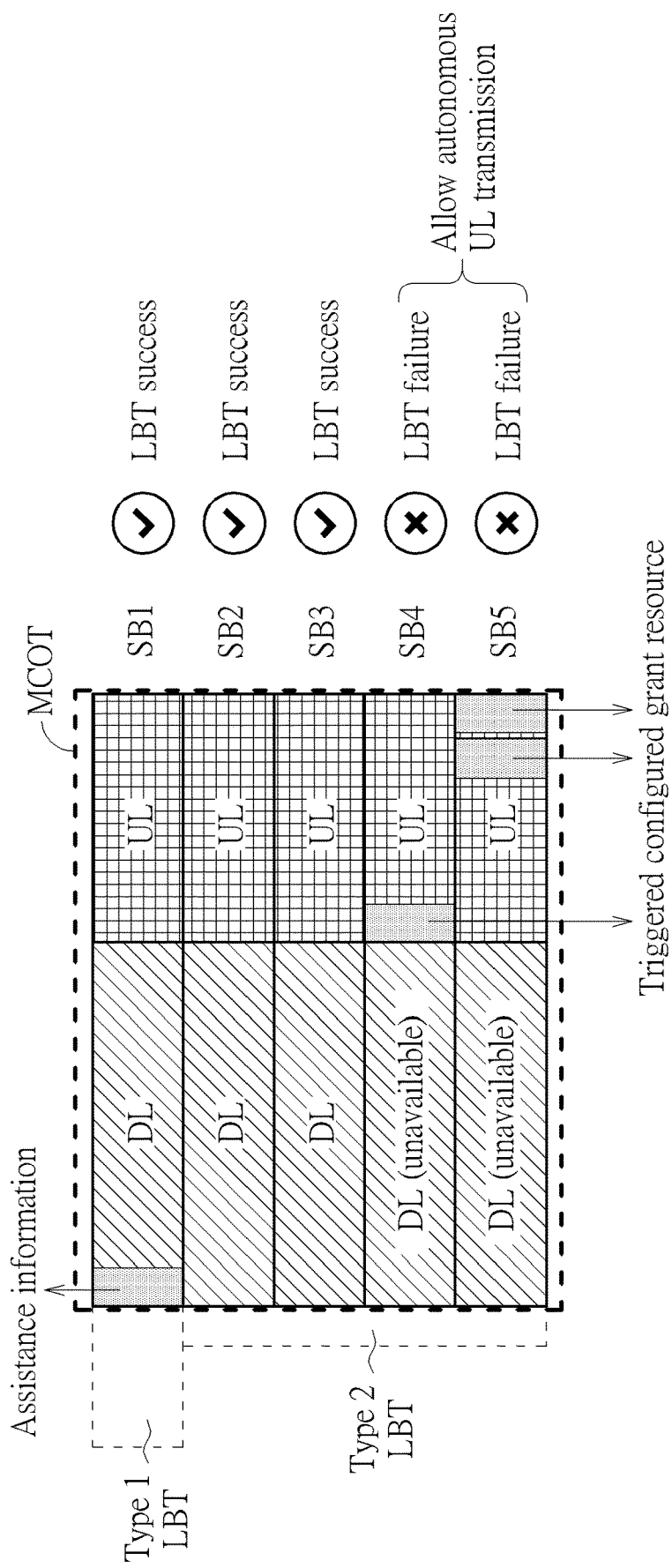
FIG. 26 illustrates an implementation of the triggered grant resource.

FIG. 26 illustrates an implementation of the triggered grant resource, wherein the UE is configured with 5 sub-bands SB1-SB5, and the sub-bands SB1-SB3 are determined to be available due to LBT success and the sub-bands SB4-SB5 are determined to be unavailable due to LBT failure. Assistance information is transmitted to the UE via the sub-band SB1, i.e., the leading sub-band, and thus the Type 1 LBT with a long sensing interval is applied to the sub-band SB1. As shown in FIG. 26, the configured grant resources in the sub-bands SB4-SB5 are triggered, allowing the UE to perform autonomous UL transmission in these grant resources, while the DL transmission in the sub-bands SB4-SB5 is unavailable.

In an embodiment, the gNB may further transmit an indication signal for the grant resource to the UE, where the indication signal instructs the UE to transmit a specific type of message in the grant resource. The specific type of message may be but not limited to a UL data, and/or a sounding reference signal for measurement. In an embodiment, the configuration of grant resources may be determined by the gNB based on received signal strength indication (RSSI) measurement reporting from the UE. For example, a sub-band having a higher RSSI value and/or a higher channel occupancy rate may imply that the sub-band may have a higher probability of LBT failure; hence, less grant resources or no grant resource may be configured in this sub-band. A sub-band having a lower RSSI value and/or a lower channel occupancy rate may imply that the sub-band may have a higher probability of LBT success; hence, more grant resources may be configured in this sub-band.

In the above embodiment, the UE may be configured with multiple grant resources in multiple sub-bands, and may perform UL transmission on the grant resource(s) in at least one of the sub-bands according to an indication from the gNB. The indication may be transmitted via a control signal in the RRC layer, MAC layer, or physical layer. In addition, the sub-band(s) may be selected and determined according to a priority rule (as indicated by a priority parameter and a number parameter).

Figure 27:
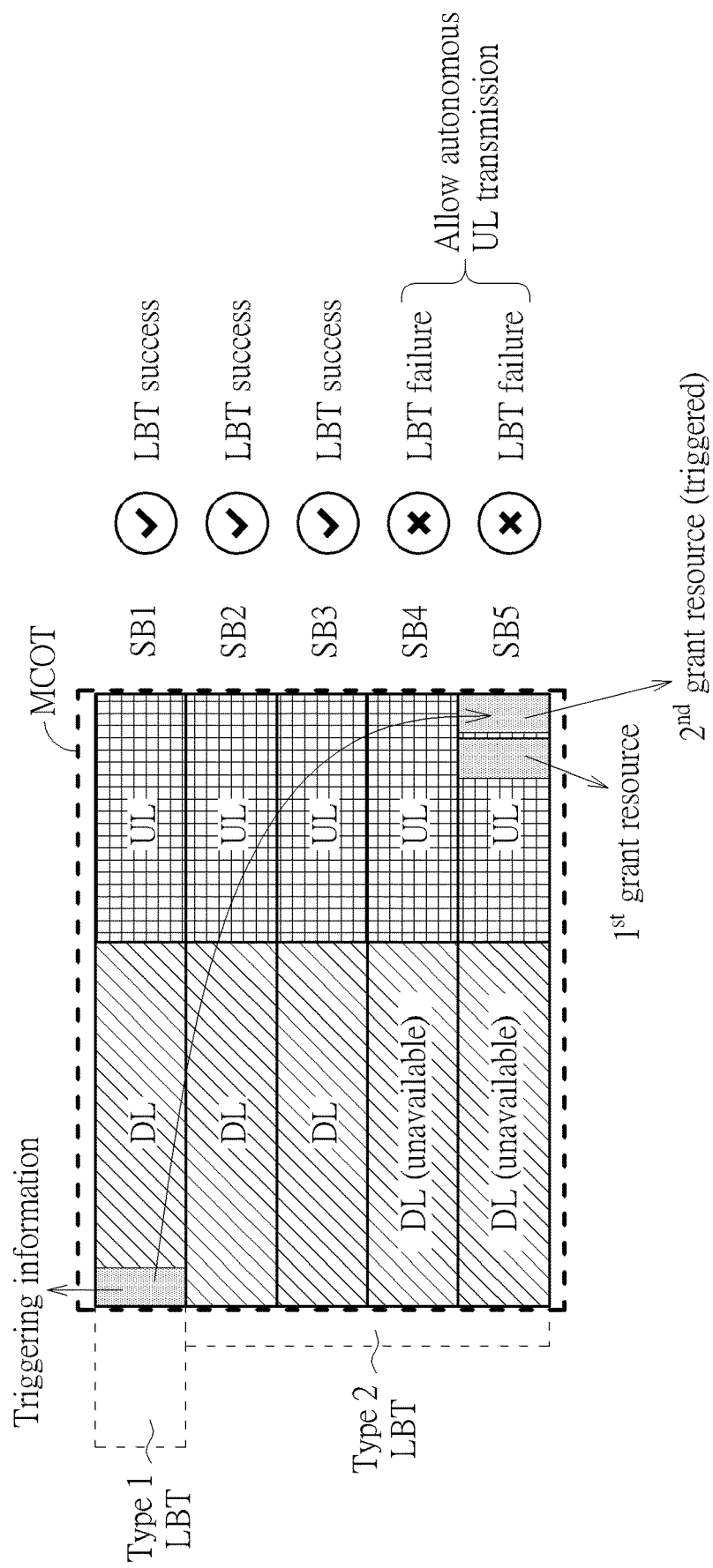
FIG. 27 illustrates triggering information indicating the triggered grant resource.

The gNB may further trigger at least one of the multiple grant resources in the selected sub-band, allowing the autonomous UL transmission in the triggered grant resources. In detail, the gNB may transmit triggering information to the UE, where the triggering information instructs the UE to perform UL transmission on at least one of the grant resources such as the triggered grant resource(s). Correspondingly, the UE may receive the triggering information from the gNB, to perform autonomous UL transmission on at least one triggered grant resource specified by the gNB. As shown in FIG. 27, the triggering information (which may be included in DCI) may indicate that the UE may perform autonomous UL transmission on the $2^{nd}$ configured grant resource in the sub-band SB5. In this embodiment, the sub-bands SB4 and SB5 are determined to be unavailable by the gNB, and thus are determined to be available for autonomous UL transmission in the configured grant resources. Note that the UL transmission in the configured grant resource should be performed after the UE performs the Type 1 LBT procedure.

Please note that in the present disclosure, a sub-band or a BWP may comprise at least one contiguous PRB in frequency domain. The number of sub-bands within a BWP may be determined according to the BWP size and the bandwidth of the sub-band. The bandwidth of a sub-band may be represented in any manner, e.g., in a fixed bandwidth value, taking PRBs as a unit, etc. The embodiments described above are applicable to a wireless communication system where the UE is configured with sub-bands and the LBT operation is performed in a unit of one sub-band, and also applicable to a wireless communication system where the UE is configured with BWPs and the LBT operation is performed in a unit of one BWP. It should also be noted that the embodiments provided in this disclosure are merely served as examples for illustrating the present invention, not for limiting the scope of the present invention. Combinations of the above embodiments may also be feasible.

In addition, in the above embodiments, the sub-band and the BWP are included in the unlicensed spectrum, such that the LBT operation is necessary. In another embodiment, the methods of the present invention are also applicable in the licensed spectrum, as long as the information such as validity or availability of the sub-band(s) and/or the BWP(s) is required to be sent to the UE from the gNB.

To sum up, the present invention aims at providing a method of handling communication in an unlicensed spectrum. In order to enhance the efficiency of spectrum utilization, the gNB may configure frequency resources flexibly and dynamically, to configure sub-bands or BWPs to each UE. On the unlicensed spectrum, the gNB is requested to perform CCA or LBT check on the sub-bands or BWPs configured to the UE, to determine whether each of the sub-bands or BWPs is available or not. The gNB may inform the UE of the availability of the sub-bands or BWPs via a DL control signal such as assistance information, which may carry a bitmap indicating the availability of each sub-band. Based on the DL control signal such as the assistance information, the UE is configured to perform DCI blind detection on specific sub-band(s) or BWP(s). The DCI may indicate the scheduling of DL/UL configurations in the MCOT of the transmission burst. The UE may further be configured to perform autonomous UL transmission on configured grant resources, which may be determined based on the availability of the sub-bands or BWPs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling communication, for a communication device of a wireless communication system, the communication device configured with a plurality of frequency bands, the method comprising:
receiving a downlink (DL) control signal from a network of the wireless communication system via a first frequency band among the plurality of frequency bands, wherein the DL control signal indicates whether at least one of the plurality of frequency bands is available or not available, wherein the communication device is configured with a grant resource in a second frequency band among the plurality of frequency bands, wherein the grant resource is triggered when the second frequency band in which the grant resource is configured is determined to be not available.

2. The method of claim 1, wherein at least one of the plurality of frequency bands is configured with a control resource set.

3. The method of claim 1, wherein more than one of the plurality of frequency bands comprise the DL control signal.

4. The method of claim 1, wherein an allocation of the plurality of frequency bands is configured by the network via at least one of a higher layer signal and a physical layer signal.

5. The method of claim 1, wherein the DL control signal comprises assistance information indicating whether each of the plurality of frequency bands is available or not available.

6. The method of claim 1, further comprising:
monitoring a search space on a resource to acquire the DL control signal.

7. The method of claim 6, wherein the search space is a common search space.

8. The method of claim 6, wherein the resource is comprised in a control resource set.

9. The method of claim 6, wherein the resource is confined in the first frequency band.

10. The method of claim 1, wherein the DL control signal further indicates an allocation of at least one DL resource, at least one uplink (UL) resource and at least one flexible resource within a corresponding transmission burst.

11. The method of claim 1, wherein the DL control signal comprises at least one of:
an offset parameter, indicating a number of slots to a start of a UL burst from a slot carrying DL control information; and
a UL burst duration parameter, indicating a number of UL slots in a maximum channel occupancy time (MOOT).

12. The method of claim 5, wherein the assistance information comprises a bitmap indicating whether at least one of the plurality of frequency bands is available or not available.

13. The method of claim 12, wherein the bitmap comprises a plurality of signal bits respectively indicating whether each of the plurality of frequency bands other than the first frequency band is available or not available.

14. The method of claim 12, wherein the bitmap comprises a plurality of signal bits respectively indicating whether each of the plurality of frequency bands is available or not available.

15. The method of claim 1, further comprising:
performing, by the communication device, a listen before talk (LBT) operation on the second frequency band; and
performing UL transmission on the configured grant resource in the second frequency band based on a result of the LBT operation performed by the communication device.

16. The method of claim 1, further comprising:
determining the grant resource according to an offset and a burst timing.

17. The method of claim 16, wherein the burst timing is a start of a transmission burst or a UL burst.

18. The method of claim 16, wherein the step of determining the grant resource according to the offset and the burst timing comprises:
determining that the grant resource is configured in a time slot indicated by the burst timing plus the offset.

19. The method of claim 1, wherein the plurality of frequency bands correspond to an unlicensed spectrum.

20. The method of claim 1, wherein each of the plurality of frequency bands is a sub-band comprised in a bandwidth part (BWP) of a cell, or each of the plurality of frequency bands is a BWP of a cell.

21. A communication device of a wireless communication system for handling communication, the communication device configured with a plurality of frequency bands and comprising:
a processor, configured to execute a program code; and
a memory, coupled to the processor, configured to store the program code which instructs the processor to perform the following step:
receiving a downlink (DL) control signal from a network of the wireless communication system via a first frequency band among the plurality of frequency bands, wherein the DL control signal indicates whether at least one of the plurality of frequency bands is available or not available, wherein the communication device is configured with a grant resource in a second frequency band among the plurality of frequency bands, wherein the communication device is configured with a plurality of grant resources, and the method further comprises:
receiving triggering information from the network; and
performing UL transmission on at least one of the plurality of grant resources according to the triggering information, comprising:
performing UL transmission on one of the plurality of grant resources in a second frequency band among the plurality of frequency bands according to the triggering information, wherein the second frequency band is determined to be not available.

* * * * *